(12) United States Patent
Suzuki et al.

(10) Patent No.: US 10,298,165 B2
(45) Date of Patent: May 21, 2019

(54) ROTARY ELECTRIC MACHINE SYSTEM

(71) Applicant: DENSO CORPORATION, Kariya, Aichi-pref. (JP)

(72) Inventors: Takashi Suzuki, Kariya (JP); Yoshitaka Hayashi, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 15/801,650

(22) Filed: Nov. 2, 2017

(65) Prior Publication Data

US 2018/0131306 A1    May 10, 2018

(30) Foreign Application Priority Data

Nov. 4, 2016    (JP) .................... 2016-216418

(51) Int. Cl.
*H02P 23/00*    (2016.01)
*H02P 25/22*    (2006.01)
(Continued)

(52) U.S. Cl.
CPC ............ *H02P 25/22* (2013.01); *B62D 5/0487* (2013.01); *H02P 6/12* (2013.01); *H02P 29/024* (2013.01);
(Continued)

(58) Field of Classification Search
CPC .......... H02P 25/22; H02P 6/12; B62D 5/0487
(Continued)

(56) References Cited

U.S. PATENT DOCUMENTS

| 7,312,595 B2 * | 12/2007 | Kamio | ............... | G05B 19/4062 |
| | | | | 318/564 |
| 2008/0067960 A1 * | 3/2008 | Maeda | ................... | B62D 5/046 |
| | | | | 318/400.02 |

(Continued)

FOREIGN PATENT DOCUMENTS

| JP | 2011-099846 A | 5/2011 |
| JP | 2012-111474 A | 6/2012 |

(Continued)

*Primary Examiner* — Eduardo Colon Santana
*Assistant Examiner* — Gabriel Agared
(74) *Attorney, Agent, or Firm* — Knobbe, Martens, Olson & Bear, LLP

(57) ABSTRACT

A rotary electric machine system includes a rotary electric machine, first and second power-supply systems, a sensor, a first abnormality determination section determining whether an abnormality has occurred in a first armature-winding group, the first power-supply system, or the sensor, a second abnormality determination section that, on condition an abnormality has been determined, controls power output depending on a type of the abnormality, increases current flowing from the second power-supply system to a second armature-winding group when output torque due to current flowing to the first armature-winding group decreases, to increase output torque due to the current flowing to the second armature-winding group, and determines whether an abnormality has occurred in one of the first armature-winding group, the first power-supply system, and the sensor, and a prohibition section that, on condition that an abnormality has been determined, prohibits power supply from the first power-supply system to the first armature-winding group.

10 Claims, 9 Drawing Sheets

(51) Int. Cl.
    *B62D 5/04*     (2006.01)
    *H02P 6/12*     (2006.01)
    *H02P 29/024*   (2016.01)
    *H02P 29/028*   (2016.01)

(52) U.S. Cl.
    CPC .......... *H02P 29/027* (2013.01); *H02P 29/028* (2013.01)

(58) Field of Classification Search
    USPC ........................................................ 318/724
    See application file for complete search history.

(56) References Cited

U.S. PATENT DOCUMENTS

| | | | |
|---|---|---|---|
| 2011/0087456 A1 | 4/2011 | Satou et al. | |
| 2011/0156627 A1 | 6/2011 | Nakamura et al. | |
| 2011/0204839 A1* | 8/2011 | Mukai ................. | B62D 5/0403 318/724 |
| 2014/0097776 A1* | 4/2014 | Hayashi .................... | H02P 6/20 318/400.21 |
| 2014/0253006 A1 | 9/2014 | Satou et al. | |

FOREIGN PATENT DOCUMENTS

| | | |
|---|---|---|
| JP | 2014-176229 A | 9/2014 |
| JP | 2015-213666 A | 12/2015 |

\* cited by examiner

ROTARY ELECTRIC MACHINE SYSTEM

CROSS-REFERENCE TO RELATED APPLICATION

This application is based on and claims the benefit of priority from earlier Japanese Patent Application No. 2016-216418 filed Nov. 4, 2016, the description of which is incorporated herein by reference.

BACKGROUND

Technical Field

The present invention relates to a rotary electric machine system that includes a rotary electric machine having a first armature winding group and a second armature winding group that are independent of each other.

Related Art

JP-A-2015-213666 discloses a configuration for determining an abnormality of a rotary electric machine. In the configuration of JP-A-2015-213666, at the timing when the voltage supplied to the rotary electric machine is a predetermined value or more, when a current equal to or less than a predetermined threshold value has continuously flowed to windings of the rotary electric machine for a predetermined time, it is determined that disconnection has occurred.

According to the configuration of JP-A-2015-213666, which determines that an abnormality has occurred in the rotary electric machine when an abnormal state has continued for a predetermined time period in the rotary electric machine, an erroneous determination that an abnormality has occurred can be prevented from being made when a temporary abnormality has occurred due to noise or the like, whereby the accuracy in determining an abnormality can be improved. However, if an abnormality has actually occurred in the rotary electric machine, the rotary electric machine cannot output torque normally. Hence, since a predetermined time period is required for the abnormality determination, there is a concern that output torque may fluctuate over the predetermined time period.

SUMMARY

An embodiment provides a rotary electric machine system that prevents output torque of a rotary electric machine from fluctuating when an abnormality has occurred in the rotary electric machine, and improves accuracy in determining the abnormality of the rotary electric machine.

As an aspect of the embodiment, a rotary electric machine system is provided which includes: a rotary electric machine that includes a first armature winding group and a second armature winding group independent of each other; a first power supply system that supplies power to the first armature winding group; a second power supply system that supplies power to the second armature winding group; a sensor that detects a predetermined state quantity used for controlling power output from the first power supply system to the first armature winding group; a first abnormality determination section that determines whether or not an abnormality has occurred in at least one of the first armature winding group, the first power supply system, and the sensor; a second abnormality determination section that, on condition that occurrence of an abnormality has been determined by the first abnormality determination section, controls the power output depending on a type of the abnormality whose occurrence is determined by the first abnormality determination section, increases an amount of current flowing from the second power supply system to the second armature winding group when output torque generated due to current flowing to the first armature winding group decreases, to increase output torque generated due to the current flowing to the second armature winding group, and determines whether or not an abnormality has occurred in at least one of the first armature winding group, the first power supply system, and the sensor; and a prohibition section that, on condition that occurrence of an abnormality has been determined by the second abnormality determination section, prohibits electrical power from being supplied from the first power supply system to the first armature winding group.

DETAILED DESCRIPTION OF THE PREFERRED EMBODIMENTS

Figure 1:
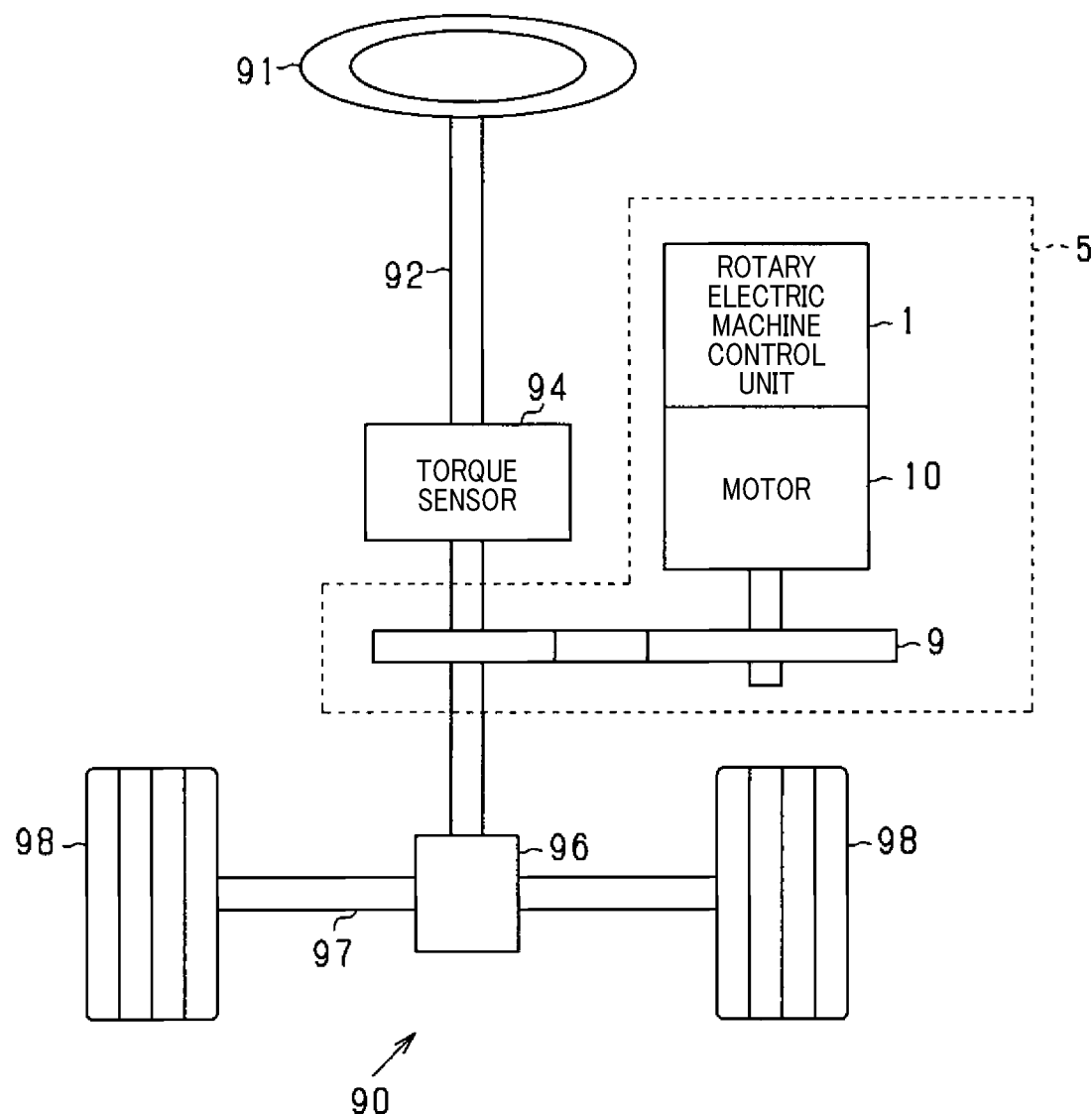
FIG. 1 is a diagram showing an overall configuration of a steering system.
Figure 2:
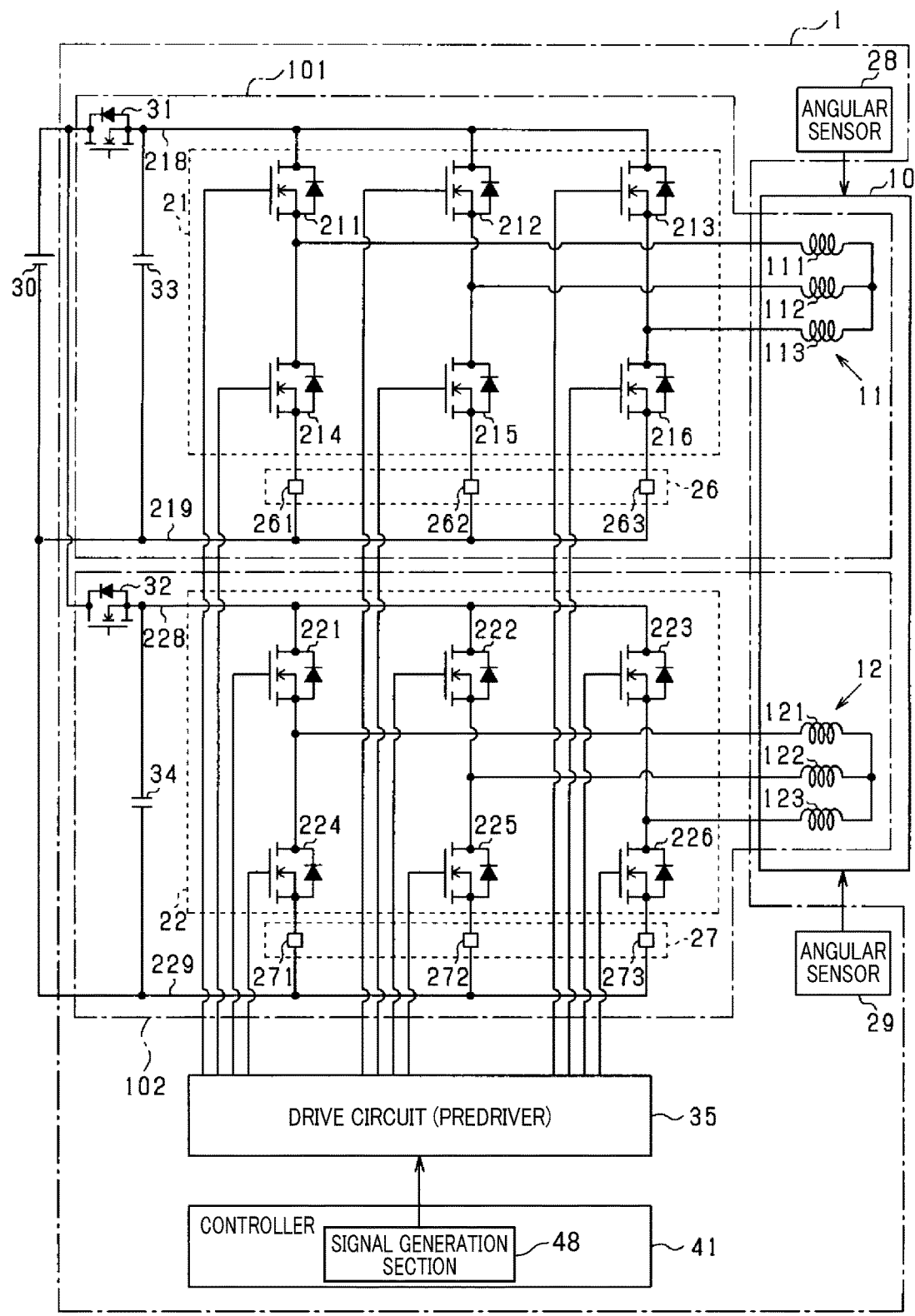
FIG. 2 is a diagram showing an electrical configuration of an electric power steering system.
Figure 3:
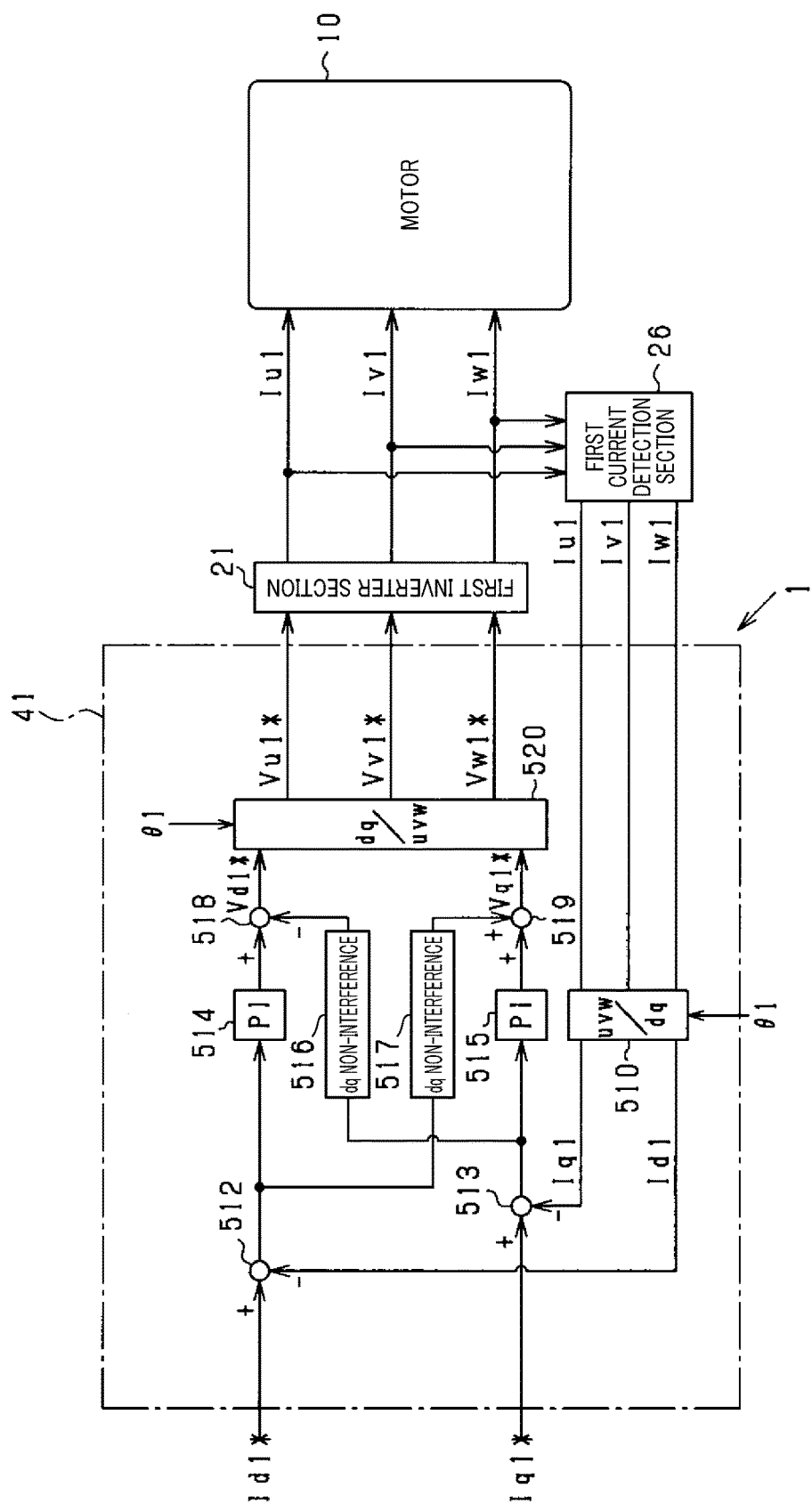
FIG. 3 is a control block diagram illustrating control of a controller.

A rotary electric machine system according to the present embodiment is shown in FIG. 1 to FIG. 3. The rotary electric machine system of the present embodiment is applied to a steering system 90 including an electric power steering system 5 for assisting steering by a driver.

FIG. 1 shows an overall configuration of the steering system 90. The steering system 90 includes a steering wheel 91, a steering shaft 92, a pinion gear 96, a rack shaft 97, wheels 98, and the electric power steering system 5.

The steering shaft 92 connected to the steering wheel 91 is provided with a torque sensor 94 that detects steering torque. The torque sensor 94 converts torque associated with the rotation of the steering shaft 92 to voltage. The end of the steering shaft 92 is provided with the pinion gear 96, which is engaged with the rack shaft 97. Both ends of the rack shaft 97 are connected with a pair of rotatable wheels 98 via tie rods.

When the driver rotates the steering wheel 91, the steering shaft 92 connected to the steering wheel 91 rotates. The rotational motion of the steering shaft 92 is converted to linear motion of the rack shaft 97 by the pinion gear 96, whereby the pair of wheels 98 is steered at an angle corresponding to the amount of displacement of the rack shaft 97.

The electric power steering system 5 includes a motor 10 (rotary electric machine) generating steering assist torque, a rotary electric machine control unit 1 driving the motor 10, and a reduction gear 9 that reduces and transmits the rotational speed of the rotating shaft to the steering shaft 92. The motor 10 of the present embodiment is a three-phase AC brushless motor, and rotates the reduction gear 9 in the forward and reverse directions.

As shown in FIG. 2, the motor 10 is a three-phase brushless motor, and has a rotor and a stator, which are not shown. The rotor is a cylindrical member, on the surface of which permanent magnets are stuck, and has magnetic poles. Two winding groups 11 and 12 (armature winding groups) are wound around the stator.

The first winding group 11 includes a U1 coil 111, a V1 coil 112, and a W1 coil 113. The second winding group 12 includes a U2 coil 121, a V2 coil 122, and a W2 coil 123.

Although the first winding group 11 and the second winding group 12 are electrically separated from each other, they are wound around the same stator and are magnetically coupled to each other by a magnetic circuit of the motor 10. In addition, the U1 coil 111 of the first winding group 11 and the U2 coil 121 of the second winding group 12 are arranged so that the phases thereof are displaced 30° with respect to each other. The coils of V phase and W phase are similarly arranged.

The rotary electric machine control unit 1 includes a first inverter section 21, a second inverter section 22, a first current detection section 26 (current sensor), a second current detection section 27, a first angular sensor 28, a second angular sensor 29, a first power supply relay 31, a second power supply relay 32, a first capacitor 33, a second capacitor 34, a drive circuit (predriver) 35, and a controller 41.

The first inverter section 21 has six switching elements (hereinafter, referred to as "switches") 211 to 216, and selectively applies electricity to the coils 111, 112, and 113 of the first winding group 11.

The drains of the upper arm switches 211, 212, and 213 provided at the high electrical potential side are connected to a positive electrode side of a battery 30 via a first upper side bus 218. The sources of the upper arm switches 211, 212, and 213 are respectively connected to the drains of the lower arm switches 214, 215, and 216 provided at the low electrical potential side. The sources of the lower arm switches 214, 215, and 216 are connected to a negative electrode side of the battery 30 via a first lower side bus 219. The connecting points between the upper arm switches 211, 212, and 213 and the lower arm switches 214, 215, and 216 are respectively connected to ends of the U1 coil 111, the V1 coil 112, and the W1 coil 113.

The second inverter section 22 has six switches 221 to 226 and selectively applies electricity to the coils 121, 122, and 123 of the second winding group 12.

The drains of the upper arm switches 221, 222, and 223 provided at the high electrical potential side are connected to the positive electrode side of the battery 30 via a second upper side bus 228. The sources of the upper arm switches 211, 212, and 213 are respectively connected to the drains of the lower arm switches 224, 225, and 226 provided at the low electrical potential side. The sources of the lower arm switches 224, 225, and 226 are connected to the negative electrode side of the battery 30 via a second lower side bus 229. The connecting points between the upper arm switches 221, 222, and 223 and the lower arm switches 224, 225, and 226 are respectively connected to ends of the U2 coil 121, the V2 coil 122, and the W2 coil 123.

All the switches 211 to 216 and 221 to 226 of the present embodiment are MOSFETs (metal-oxide semiconductor field-effect transistors), but may be IGBTs (insulated gate bipolar transistors), thyristors, or mechanical relay switches.

The first current detection section 26 includes current detecting elements 261, 262, and 263. The current detecting element 261 is provided at the low electrical potential side of the switch 214, and detects a U1 current Iu1, which is applied to the U1 coil 111. The current detecting element 262 is provided at the low electrical potential side of the switch 215, and detects a V1 current Iv1, which is applied to the V1 coil 112. The current detecting element 263 is provided at the low electrical potential side of the switch 216, and detects a W1 current Iw1, which is applied to the W1 coil 113.

The second current detection section 27 includes current detecting elements 271, 272, and 273. The current detecting element 271 is provided at the low electrical potential side of the switch 224, and detects a U2 current Iu2, which is applied to the U2 coil 121. The current detecting element 272 is provided at the low electrical potential side of the switch 225, and detects a V2 current Iv2, which is applied to the V2 coil 122. The current detecting element 273 is provided at the low electrical potential side of the switch 226, and detects a W2 current Iw2, which is applied to the W2 coil 123. The current detecting elements 261 to 263 and 271 to 273 of the present embodiment are shunt resistors. It is noted that Hall elements or the like may be used instead of the shunt resistors.

The angular sensors 28 and 29 detect rotational angles of the motor 10. Each of the angular sensors 28 and 29 is configured by a magnet, which is a magnetism generating section provided at the rotor side of the motor 10, and a magnetism detecting element provided close to the magnet. The angular sensors 28 and 29 output voltage corresponding to the rotational angles of the motor 10. The magnetism detecting elements configuring the angular sensors 28 and 29 are, specifically, tunnel magneto resistance (TMR) elements. It is noted that Hall elements or the like may be used as the magnetism detecting elements configuring the angular sensors 28 and 29. The electrical angles θ of the motor 10 detected by the angular sensors 28 and 29 are output to the controller 41.

The angular sensors 28 and 29 output a sine wave voltage (sinusoidal voltage) corresponding to the rotational angle of the rotor of the motor 10 and a cosine wave voltage whose phase advances by 90° with respect to the sine wave voltage. In addition, the angular sensors 28 and 29 respectively include a first magnetism detecting element that outputs a first cosine wave voltage Vx1 and a first sine wave voltage Vy1 and a second magnetism detecting element that outputs a second cosine wave voltage Vx2 and a second sine wave voltage Vy2 to address abnormalities in the angular sensors 28 and 29 and the like. If the angular sensors 28 and 29 are in normal states, the cosine wave voltage Vx1 and the cosine wave voltage Vx2 are substantially equal to each other, and the first sine wave voltage Vy1 and the second sine wave voltage Vy2 are substantially equal to each other.

The contoller 41 described later calculates arc tangents of the ratios between the cosine wave voltages Vx1, Vx2 and the sine wave voltages Vy1, Vy2 (Vy1/Vx1, Vy2/Vx2) to obtain the rotational angles θ of the motor 10. The detection value of the electrical angle of the motor 10 obtained based on an output value of the first angular sensor 28 is indicated by θ1, and the detection value of the electrical angle of the motor 10 obtained based on an output value of the second angular sensor 29 is indicated by θ2.

The first power supply relay 31 is provided so as to interrupt power supply from the battery 30 to the first inverter section 21. The second power supply relay 32 is provided so as to interrupt power supply from the battery 30 to the second inverter section 22. In the present embodiment, the power supply relays 31 and 32 are MOSFETs as in the switch 211 and the like, but may be IGBTs, thyristors, or mechanical relay switches.

In addition, in the case where the power supply relays 31 and 32 are MOSFETs, to prevent currents from flowing in the reverse direction through diodes when the battery 30 is erroneously connected in the reverse direction, reverse connection protection relays (not shown) are preferably provided which are respectively connected to the power supply relays 31 and 32 in series so that the diodes face in the reverse direction.

The first capacitor 33 is connected to the battery 30 and the input side of the first inverter section 21 in parallel. The second capacitor 34 is connected to the battery 30 and the input side of the second inverter section 22 in parallel. The capacitors 33 and 34 store charge to stabilize input voltages to the inverter sections 21 and 22 and to reduce noise components such as surge current.

In the present embodiment, the first winding group 11, and the first inverter section 21, the first current detection section 26, the first angular sensor 28, the first power supply relay 31, and the first capacitor 33, which are related to electrifying control of the first winding group 11, are included in a first system 101. The second winding group 12, and the second inverter section 22, the second current detection section 27, the second angular sensor 29, the second power supply relay 32, and the second capacitor 34, which are related to electrifying control of the second winding group 12, are included in a second system 102.

The controller 41 controls the whole electric power steering system 5 and is configured by a microcomputer or the like performing various calculations. The processes of the controller 41 may be performed by software, which is a program previously stored in a ROM or the like and is executed by a CPU, or by hardware such as dedicated electronic circuits.

The controller 41 has a signal generation section 48. The signal generation section 48 generates control signals for turning on and off the switches 211 to 216 and 221 to 226 based on, for example, steering torque obtained from the torque sensor 94 and electrical angles θ1 and θ2 obtained from the angular sensors 28 and 29. The generated control signals are output to the gates of the switches 211 to 216 and 221 to 226 through the drive circuit 35. The controller 41 controls on and off operations of the switches 211 to 216 and 221 to 226 to drive the motor 10. It is noted that, in FIG. 2, the configurations other than the signal generation section 48 in the controller 41 are not shown.

FIG. 3 shows the controller 41 in detail. In FIG. 3, the configuration related to the control of the first system 101 (control performed by a first controller) is shown. In addition, the controller 41 includes the configuration related to the control of the second system 102, which is not shown in FIG. 3.

The controller 41 has a three-phase two-phase converter 510, subtracters 512 and 513, controllers 514 and 515, dq non-interference voltage calculators 516 and 517, non-interference voltage correctors 518 and 519, and a two-phase three-phase converter 520.

The three-phase two-phase converter 510 converts the U1 current detection value Iu1, the V1 current detection value Iv1, and the W1 current detection value Iw1 detected by the first current detection section 26 from a UVW coordinate system to a dq coordinate system based on the electrical angles θ1 to calculate a d axis current detection value Id1 and a q axis current detection value Iq1 of the first winding group 11. The current detection values Id1 and Iq1 of the dq axis are values obtained by performing dq conversion of the three-phase current detection values Iu1, Iv1, and Iw1, and are included in the concept of current detection values.

The d axis subtracter 512 calculates a d axis current difference ΔId1. The d axis current difference ΔId1 is the difference between a d axis current command value Id1* and the d axis current detection value Id1 to be subjected to feedback control. The q axis subtracter 513 calculates a q axis current difference ΔIq1. The q axis current difference ΔIq1 is the difference between a q axis current command value Iq1* and the q axis current detection value Iq1 to be subjected to feedback control.

The d axis controller 514 calculates a basic d axis voltage command value Vd1*_b by PI calculation so that the d axis current difference ΔId1 converges to 0. The q axis controller 515 calculates a basic q axis voltage command value Vq1*_d by PI calculation so that the q axis current difference ΔIq1 converges to 0. The controllers 514 and 515 may perform PID calculation or the like.

The dq non-interference voltage calculator 516 calculates a d axis non-interference voltage Vd1_dc base on the q axis current difference ΔIq1. The dq non-interference voltage calculator 517 calculates a q axis non-interference voltage Vq1_dc base on the d axis current difference ΔId1.

The d axis non-interference voltage corrector 518 subtracts the d axis non-interference voltage Vd1_dc from the basic d axis voltage command value Vd1*_b to calculate a d axis voltage command value Vd1*. The q axis non-interference voltage corrector 51 adds the q axis non-interference voltage Vd1_dc to the basic q axis voltage command value Vq1*_b to calculate a q axis voltage command value Vq1*.

The two-phase three-phase converter 520 performs inverse dq conversion by which the d axis voltage command value Vd1* and the q axis voltage command value Vq1* are converted from a dq coordinate system to a UVW coordinate system based on the electrical angles θ1 to calculate a U-phase voltage command value Vu1*, a V-phase voltage command value Vv1*, and a W-phase voltage command value Vw1*.

The voltage command values Vu1*, Vv1*, and Vw1* calculated by the two-phase three-phase converter 520 are output to the signal generation section 48 (see FIG. 2). The signal generation section 48 generates control signals for turning on and off the switches 211 to 216 based on the voltage command values Vu1*, Vv1*, and Vw1*. Specifically, the signal generation section 48 performs PWM operation so that voltages corresponding to the voltage command values Vu1*, Vv1*, and Vw1* are output. The generated control signals are output to the first inverter section 21 through the drive circuit 35 (see FIG. 2). In FIG. 3, the signal generation section 48 and the drive circuit 35 are not shown.

Since the control of the second system 102 (the operation performed by a second controller) by the controller 41 is equivalent to the control of the first system 101 described above, the description of the control of the second system 102 is omitted. In the present embodiment, the controller 41 serving as the first controller controls the first inverter section 21 based on the detection value θ1 of the first angular sensor 28. The controller 41 serving as the second controller performs power control of the second inverter section 22 based on the detection value θ2 of the second angular sensor 29. The controller of the first inverter section 21 and the controller of the second inverter section 22 may be different from each other.

As described above, the electric power steering system 5 of the present embodiment controls driving of the motor 10 having a plurality of winding groups 11 and 12 magnetically coupled to each other, and includes the inverter sections 21 and 22 and the controller 41.

The inverter sections 21 and 22 are respectively provided for the winding groups 11 and 12. The first inverter section 21 has the upper arm switches 211 to 213 provided so as to correspond to the respective phases of the first winding group 11 and the lower arm switches 214 to 216 connected to the low electrical potential side of the upper arm switches 211 to 213. The second inverter section 22 has the upper arm switches 221 to 223 provided so as to correspond to the respective phases of the second winding group 12 and the lower arm switches 224 to 226 connected to the low electrical potential side of the upper arm switches 221 to 223. The controller 41 controls the inverter sections 21 and 22. Specifically, the controller 41 controls on and off operations of the switches 211 to 216 and 221 to 226 of the inverter sections 21 and 22.

Figure 4:
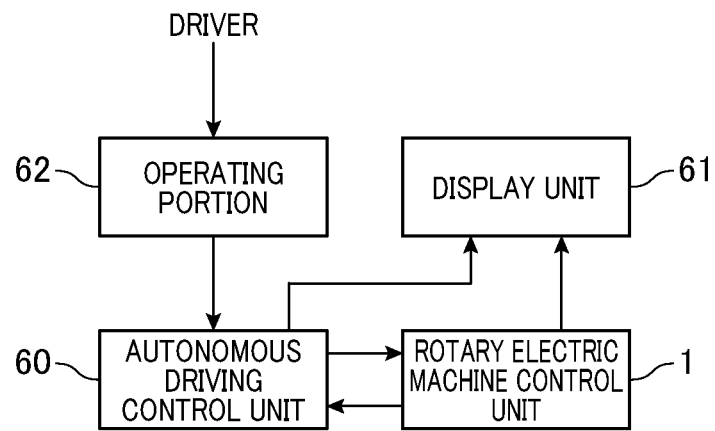
FIG. 4 is a diagram illustrating a relationship between a rotary electric machine control unit and an autonomous driving control unit.

As shown in FIG. 4, the rotary electric machine control unit 1 (controller 41) communicates with a control unit 60, which controls autonomous driving of the vehicle, and a display unit 61.

The control unit 60 selectively performs manual control and autonomous control depending on an input signal received from an operation unit 63 operated by the driver or the like. Under manual control, the traveling state of the vehicle is controlled depending on the operation of the driver. Under autonomous control, the traveling state of the vehicle is autonomously controlled depending on the input from various sensors.

The autonomous control performed by the control unit 60 includes the combination of control depending on the operation of the driver and autonomous control, for example, the combination of the control related to acceleration and deceleration of the vehicle depending on the operation of the driver and the control of autonomously steering the vehicle. During autonomous control, the control unit 60 autonomously controls the steering of the vehicle based on information input from various sensors including a camera mounted to the vehicle.

The display unit 61 typically displays information such as speed of the vehicle, and includes a display portion including a liquid crystal display and a controller controlling the display portion. An operation portion 62 may include switches that are mechanically operated and software-based elements operated by input to a touch panel or input of a sound.

The control unit 60 switches from the manual control to the autonomous control in response to the operation of the operation portion 62 by the driver. When steering of the vehicle is autonomously controlled, the control unit 60 informs the rotary electric machine control unit 1 of the amount of torque (torque command value) to be output from the motor 10. The rotary electric machine control unit 1 performs the control of making the motor 10 output torque corresponding to the torque command value. It is noted that the control unit 60 may inform the rotary electric machine control unit 1 of, for example, a rotational angle of the steering shaft 92 instead of the torque command value.

In the state where an abnormality has occurred in the electric power steering system 5 including the motor 10, autonomous control cannot be performed normally. Hence, when an abnormality has occurred in the electric power steering system 5, the control unit 60 prohibits switching from normal control to autonomous control. It is noted that the controller 41 may prohibit switching from normal control to autonomous control.

The controller 41 determines an abnormality of the electric power steering system 5. Specifically, the controller 41 determines an abnormality of the first winding group 11, abnormalities of a first power supply system that includes the first inverter section 21 supplying electrical power to the first winding group 11 and lines between the first winding group 11 and the first inverter section 21, and abnormalities of the first current detection section 26 and the first angular sensor 28 that detect predetermined state quantities (θ1, Id1, Iq1) used for controlling power output from the first inverter section 21 to the first winding group 11. In addition, the controller 41 determines an abnormality of the second winding group 12, abnormalities of a second power supply system that includes the second inverter section 22 supplying electrical power to the second winding group 12 and lines between the second winding group 12 and the second inverter section 22, and abnormalities of the second current detection section 27 and the second angular sensor 29 that detect predetermined state quantities (θ2, Id2, Iq2) used for controlling power output from the second inverter section 22 to the second winding group 12.

When an abnormality of the electric power steering system 5 is determined, one of the winding groups 11 and 12, whose abnormality is to be determined by the controller 41, corresponds to the first armature winding group, and the other of the winding groups 11 and 12, whose abnormality is not to be determined, corresponds to the second armature winding group. Hereinafter, the first winding group 11 corresponds to the first armature winding group, whose abnormality is to be determined, and the second winding group 12 corresponds to the second armature winding group, whose abnormality is not to be determined. The controller 41 also determines an abnormality of the second system 102 including the second winding group 12. However, since the determination of an abnormality of the second system 102 is equivalent to that of the first system including the first winding group 11, the description of the determination of an abnormality of the second system 102 is omitted.

The controller 41 serving as a first abnormality determination section determines whether an abnormality has occurred in at least one of the first winding group 11, the power supply system supplying electrical power to the first winding group 11, the first current detection section 26, and the first angular sensor 28. On condition that the occurrence of an abnormality has been determined by the controller 41 serving as the first abnormality determination section, the controller 41 serving as the second abnormality determination section controls power output of the first inverter section 21 depending on the type of the abnormality whose occurrence is determined by the controller 41 serving as the first abnormality determination section. In addition, on condition that the occurrence of an abnormality has been determined by the controller 41 serving as the first abnormality determination section, the controller 41 serving as the second abnormality determination section increases the amount of current flowing from the second inverter section 22 to the second winding group 12 when output torque generated due to the current flowing to the first winding group 11 decreases, thereby increasing output torque generated due to the current flowing to the second winding group 12. In this case, the amount of current flowing from the second inverter section 22 to the second winding group 12 is increased so as not to exceed the maximum value of the current that can flow to the second winding group 12.

Furthermore, the controller 41 serving as the second abnormality determination section determines again whether an abnormality has occurred in at least one of the first winding group 11, the power supply system supplying electrical power to the first winding group 11, the first current detection section 26, and the first angular sensor 28. Then, the controller 41 serving as a prohibition section prohibits electrical power from being supplied from the first inverter section 21 to the first winding group 11 on condition that the occurrence of an abnormality has been determined by the controller 41 serving as the second abnormality determination section.

The controller 41 serving as the first abnormality determination section and the second abnormality determination section determines a short-circuit abnormality, an open abnormality, an abnormality of the first current detection section 26, and an abnormality of the first angular sensor 28 as described later. Hereinafter, the open abnormality, the abnormality of the first current detection section 26, and the abnormality of the first angular sensor 28 will be described.

The determination of a short-circuit abnormality by the controller 41 will be described. The controller 41 serving as the first abnormality determination section determines whether or not a short-circuit abnormality has occurred in at least one of the winding group 11 and the first power supply system supplying electrical power to the winding group 11. The first power supply system supplying electric power to the first winding group 11 includes lines between the battery 30 and the first inverter section 21 (the first upper side bus 218, and the first lower side bus 219), the first inverter section 21 supplying electrical power to the winding group 11, and lines between the winding group 11 and the first inverter section 21. In addition, the short-circuit abnormality includes an earth fault caused by the contact between the winding group 11 and a housing, a short-circuit failure (stuck open) of the switches 211 to 216 of the first inverter section 21, an earth fault caused by the contact between the line, between the battery 30 and the first inverter section 21, and the housing or the like, and an earth fault caused by the contact between the line, between the winding group 11 and the first inverter section 21, and the housing or the like.

The controller 41 determines the occurrence of a short-circuit failure based on the detection values of the phase currents Iu1, Iv1, and Iw1 obtained by the first current detection section 26 or the detection value of input current flowing from the battery 30 to the first inverter section 21. More specifically, if the detection values of the phase currents Iu1, Iv1, and Iw1 obtained by the first current detection section 26 exceed a predetermined threshold value, the controller 41 determines that a short-circuit failure has occurred in the winding group 11 or in the line between the winding group 11 and the first inverter section 21. In addition, if the detection value of input current from the battery 30 to the first inverter section 21 exceeds a predetermined value, the controller 41 determines that a short-circuit failure has occurred in the line between the battery 30 and the first inverter section 21 or in the first inverter section 21.

On condition that the occurrence of a short-circuit abnormality has been determined by the controller 41 serving as the first abnormality determination section, the controller 41 serving as the second abnormality determination section decreases the amount of current flowing from the first inverter section 21 to the first winding group 11. Hence, the first winding group 11 and the power supply system including the first inverter section 21 are prevented from being damaged by short-circuit current flowing through the first winding group 11 and the power supply system including the first inverter section 21. In addition, on condition that the occurrence of a short-circuit abnormality has been determined by the controller 41 serving as the first abnormality determination section, the controller 41 serving as the second abnormality determination section increases the amount of current flowing from the second inverter section 22 to the second winding group 12, thereby increasing output torque generated due to the current flowing to the second winding group 12.

Specifically, the controller 41 serving as the second abnormality determination section sets the command value $Iq1^*$ of the q axis current flowing to the first winding group 11 to 0 A and sets the command value $Id1^*$ of the d axis current to 10 A. In addition, the controller 41 sets a command value $Iq2^*$ of the q axis current flowing to the second winding group 12 to twice that set before the controller 41 serving as the first abnormality determination section determines that a short-circuit abnormality has occurred. It is noted that the controller 41 may double the d axis current command value $Id2^*$. According to the present control, the torque equivalent to that obtained before the controller 41 serving as the first abnormality determination section determines that a short-circuit abnormality has occurred can be output from the motor 10.

In the state where the amount of current flowing from the first inverter section 21 to the first winding group 11 is decreased, the controller 41 serving as the second abnormality determination section determines again the occurrence of a short-circuit failure based on the detection values of the phase currents Iu1, Iv1, and Iw1 obtained by the first current detection section 26 or the detection value of input current flowing from the battery 30 to the first inverter section 21. Then, the controller 41 serving as the prohibition section prohibits electrical power from being supplied from the first inverter section 21 to the first winding group 11 on condition that the occurrence of a short-circuit failure has been determined by the controller serving as the second abnormality determination section.

Next, the determination of an open abnormality by the controller 41 will be described. The controller 41 serving as the first abnormality determination section determines whether or not an open abnormality has occurred in at least one of the first winding group 11 and the power supply system supplying electrical power to the first winding group 11. The open abnormality includes disconnection in the first winding group 11, an open failure (stuck open) of the switches 211 to 216 of the first inverter section 21, disconnection of a line between the battery 30 and the first inverter section 21, and disconnection of a line between the first winding group 11 and the first inverter section 21.

The controller 41 determines the occurrence of an open failure based on the detection values of the phase currents Iu1, Iv1, and Iw1 obtained by the first current detection section 26 or the detection value of input current flowing from the battery 30 to the first inverter section 21. More specifically, if the detection values of the phase currents Iu1, Iv1, and Iw1 obtained by the first current detection section 26 fall below a predetermined threshold value under a situation in which the first inverter section 21 is outputting a predetermined voltage, the controller 41 determines that an open abnormality has occurred in the first winding group 11, the line between the first winding group 11 and the first inverter section 21, or the first inverter section 21. In addition, if the detection value of input current flowing from the battery 30 to the first inverter section 21 falls below a predetermined value under a situation in which the command values Vu1*, Vv1*, and Vw1* of the output voltage of the first inverter section 21 are predetermined voltages larger than 0, the controller 41 determines that an open abnormality has occurred in the line between the battery 30 and the first inverter section 21 or in the first inverter section 21.

On condition that the occurrence of an open abnormality has been determined by the controller 41 serving as the first abnormality determination section, the controller 41 serving as the second abnormality determination section increases the amount of current flowing from the second inverter section 22 to the second winding group 12, thereby increasing output torque generated due to the current flowing to the second winding group 12. Specifically, the controller 41 calculates the difference between the detection value Iq1 and the command value Iq1* of output current flowing from the first inverter section 21 to the first winding group 11, and adds the difference to the command value Iq2* of output current flowing from the second inverter section 22 to the second winding group 12. According to the present control, the torque equivalent to that obtained before the controller 41 serving as the first abnormality determination section determines that an open abnormality has occurred can be output from the motor 10.

In addition, if the occurrence of an open abnormality is determined by the controller 41 serving as the first abnormality determination section, the controller 41 serving as the second abnormality determination section does not change the command values Id1* and Iq1* of output current flowing from the first inverter section 21 to the first winding group 11, and continues outputting electrical power from the first inverter section 21 to the first winding group 11. According to the present control, in the first winding to group 11, the first inverter section 21, or the line between the first winding group 11 and the first inverter section 21, when an open abnormality has occurred in any one of the U phase, V phase, and W phase, and the other two phases are in normal states, torque can be output by applying current to the normal two phases.

The controller 41 serving as the second abnormality determination section determines again the occurrence of an open abnormality based on the detection values of the phase currents Iu1, Iv1, and Iw1 obtained by the first current detection section 26 or the detection value of input current flowing from the battery 30 to the first inverter section 21. Then, the controller 41 serving as the prohibition section prohibits electrical power from being supplied from the first inverter section 21 to the first winding group 11 on condition that the occurrence of an open abnormality has been determined by the controller serving as the second abnormality determination section.

Next, determination of an abnormality in the first current detection section 26 by the controller 41 will be described. The controller 41 serving as the first abnormality determination section determines whether or not an abnormality has occurred in the first current detection section 26. The sum of the detection values of the currents Iu1, Iv1, and Iw1 obtained from the first current detection section 26 is substantially 0 when the first current detection section 26 is in a normal state, and is more than 0 when an abnormality has occurred in the detecting elements 261 to 263 that detect phase currents or the lines between the detecting elements 261 to 263 and the controller 41. The controller 41 determines that an abnormality has occurred in the first current detection section 26 when the sum of the detection values of the currents Iu1, Iv1, and Iw1 obtained from the first current detection section 26 is more than a predetermined value (not substantially 0).

On condition that the occurrence of an abnormality in the first current detection section 26 has been determined by the controller 41 serving as the first abnormality determination section, the controller 41 serving as the second abnormality determination section decreases the amount of current flowing from the first inverter section 21 to the first winding group 11. Hence, fluctuations of output torque of the motor 10 due to the excessive current flowing to the first winding group 11 can be suppressed. In addition, on condition that the occurrence of an abnormality in the first current detection section 26 has been determined by the controller 41 serving as the first abnormality determination section, the controller 41 serving as the second abnormality determination section increases the amount of current flowing from the second inverter section 22 to the second winding group 12, thereby increasing output torque generated by the current flowing to the second winding group 12.

Specifically, the controller 41 serving as the second abnormality determination section sets the command value Iq1* of the q axis current flowing to the first winding group 11 to 0 A. Furthermore, the controller 41 varies the command value Id1* of the d axis current with a period longer than the time constant of the circuit at the first winding group 11 side with respect to the first inverter section 21 so that the root-mean-square value of the electrical power output from the first inverter section 21 becomes 0. According to present control, fluctuations of a yaw rate due to the current flowing to the first winding group 11 can be suppressed. In addition, since current flows from the first inverter section 21 to the first winding group 11, abnormality determination for the first current detection section 26 can be continues. Furthermore, the controller 41 may change the command value Id1* of the d axis current with a period shorter than the yaw rate time constant, which is response time between the time when torque is output from the motor 10 to the time when the yaw rate of the vehicle varies.

In addition, the controller 41 sets the command value Iq1* of the q axis current flowing to the second winding group 12 to twice that set before the controller 41 serving as the first abnormality determination section determines that a short-circuit abnormality has occurred. It is noted that the controller 41 may double the d axis current command value Id2*. According to the present control, the torque equivalent to that obtained before the controller 41 serving as the first abnormality determination section determines that a short-circuit abnormality has occurred can be output from the motor 10.

The controller 41 serving as the second abnormality determination section determines again presence or absence of the occurrence of an abnormality in the first current detection section 26 based on the detection value obtained from the first current detection section 26. Then, the controller 41 serving as the prohibition section prohibits electrical power from being supplied from the first inverter section 21 to the first winding group 11 on condition that the occurrence of an abnormality in the first current detection section 26 has been determined by the controller 41 serving as the second abnormality determination section.

Next, the determination of an abnormality in the first angular sensor 28 by the controller 41 will be described. The controller 41 serving as the first abnormality determination section determines whether or not an abnormality has occurred in the first angular sensor 28. The first angular sensor 28 includes two detection elements outputting the same rotational angle. If the detection elements are in normal states, the output values of the detection elements are the same. Hence, the controller 41 compares the output values of the two detection elements configuring the first angular sensor 28, and determines that an abnormality has occurred in the first angular sensor 28 if the output values differ from each other by a predetermined value or more.

Figure 5:
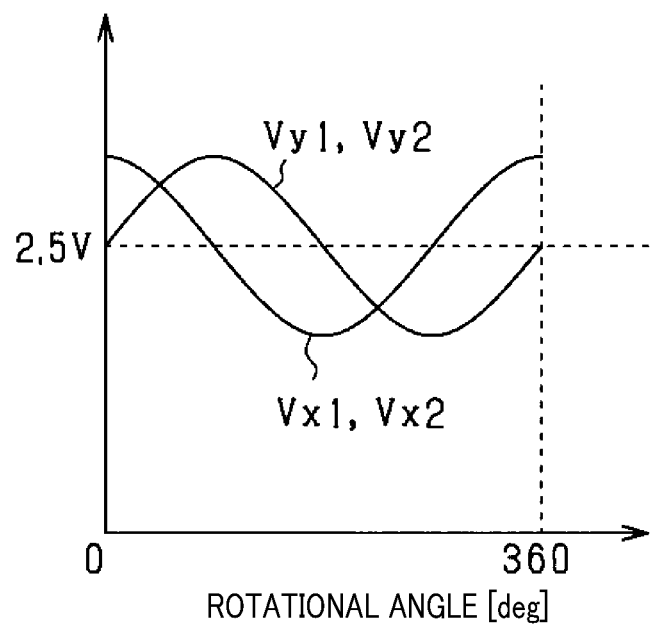
FIG. 5 is a diagram illustrating output voltage of an angular sensor.

Specifically, the controller 41 compares the cosine wave voltage Vx1 output from the first magnetism detecting element of the first angular sensor 28 with the cosine wave voltage Vx2 output from the second magnetism detecting element of the first angular sensor 28. In addition, the controller 41 compares the sine wave voltage Vy1 output from the first magnetism detecting element of the first angular sensor 28 with the sine wave voltage Vy2 output from the second magnetism detecting element of the first angular sensor 28. FIG. 5 shows the cosine wave voltages Vx1 and Vx2 and the sine wave voltages Vy1 and Vy2 output from the magnetism detecting elements. If the difference between the cosine wave voltages Vx1 and Vx2 is a predetermined value or more, or if the difference between the sine wave voltages Vy1 and Vy2 is a predetermined value or more, the controller 41 determines that an abnormality has occurred in the first angular sensor 28.

On condition that the occurrence of an abnormality in the first angular sensor 28 has been determined by the controller 41 serving as the first abnormality determination section, the controller 41 serving as the second abnormality determination section decreases the amount of current flowing from the first inverter section 21 to the first winding group 11. Hence, fluctuations of output torque of the motor 10 are suppressed. In addition, on condition that the occurrence of an abnormality in the first angular sensor 28 has been determined by the controller 41 serving as the first abnormality determination section, the controller 41 serving as the second abnormality determination section increases the amount of current flowing from the second inverter section 22 to the second winding group 12, thereby increasing output torque generated due to the current flowing to the second winding group 12.

Specifically, the controller 41 serving as the second abnormality determination section sets the command value Ig1* of the q axis current and the command value Id1* of the d axis current flowing to the first winding group 11 to 0 A. In addition, the controller 41 sets the command value Iq2* of the q axis current flowing to the second winding group 12 to twice that set before the controller 41 serving as the first abnormality determination section determines that an abnormality has occurred in the first angular sensor 28. It is noted that the controller 41 may double the d axis current command value Id2*. According to the present control, the torque equivalent to that obtained before the controller 41 serving as the first abnormality determination section determines that an abnormality has occurred in the first angular sensor 28 can be output from the motor 10.

The controller 41 serving as the second abnormality determination section compares the output of the first angular sensor 28 with the output of the second angular sensor 29, and determines again presence or absence of the occurrence of an abnormality in the first angular sensor 28. Then, the controller 41 serving as the prohibition section prohibits electrical power from being supplied from the first inverter section 21 to the first winding group 11 on condition that the occurrence of an abnormality in the first angular sensor 28 has been determined by the controller 41.

Figure 6:
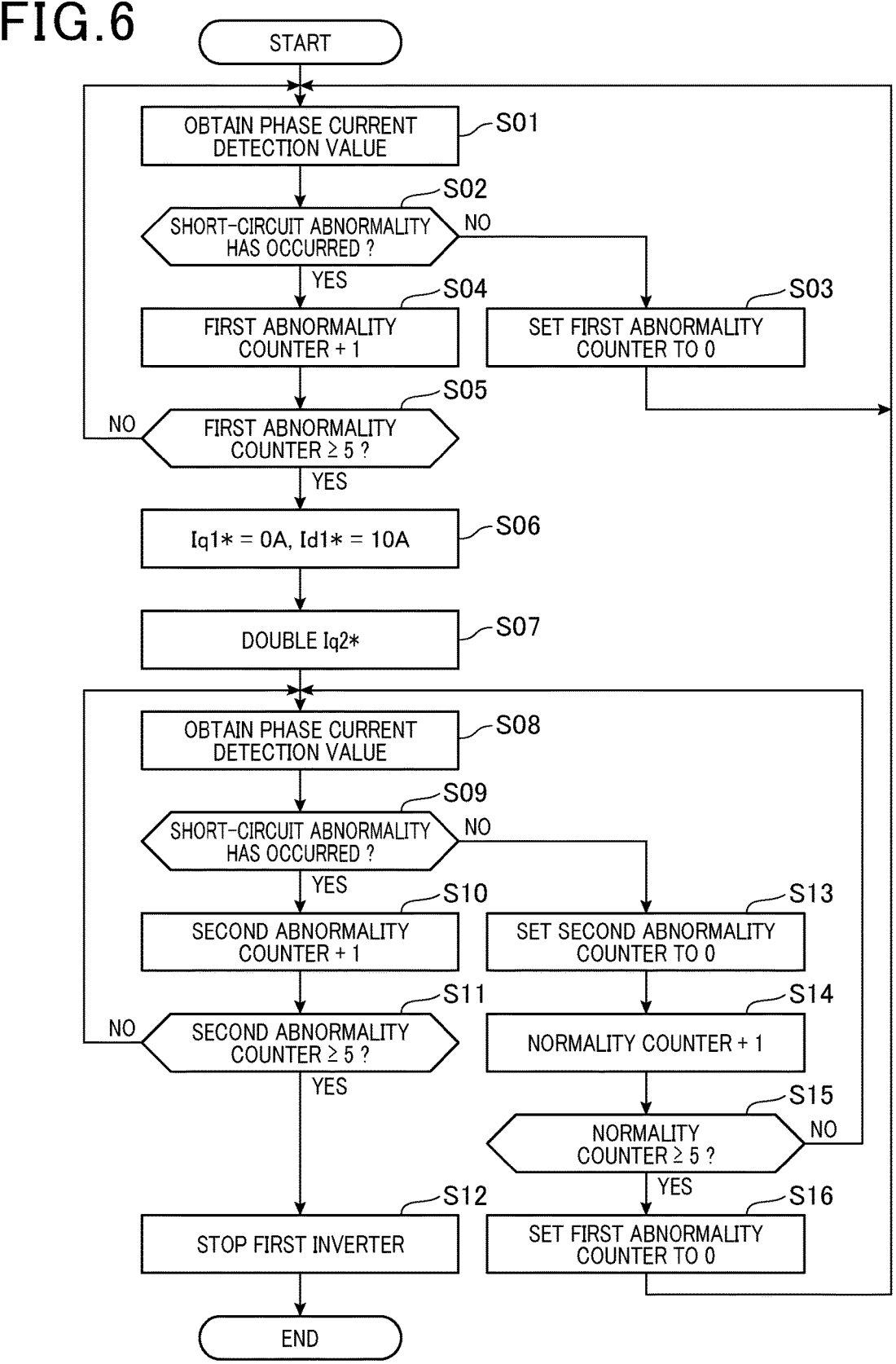
FIG. 6 is a flowchart of an abnormality determination process regarding a short-circuit abnormality.

FIG. 6 shows a flowchart of a determination process regarding a short-circuit abnormality. The present determination process is performed by the controller 41. Steps S01 to S05 correspond to processes performed by the first abnormality determination section. Steps S06 to S12 correspond to processes performed by the second abnormality determination section.

In step S01, the controller 41 obtains, from the first current detection section 26, detection values of the currents Iu1, Iv1, and Iw1 of the respective phases flowing from the first inverter section 21 to the first winding group 11. In step S02, the controller 41 determines whether or not a short-circuit abnormality has occurred based on the detection values of the currents Iu1, Iv1, and Iw1 of the respective phases. Specifically, the controller 41 determines whether or not a short-circuit abnormality has occurred based on whether or not at least one of the detection values of the phase currents Iu1, Iv1, and Iw1 has exceeded a predetermined threshold value. The threshold value used for the determination in step S02 is set to be more than the maximum values of the currents Iu1, Iv1, and Iw1 of the respective phases obtained when the motor 10 operates normally and so as to be able to determine whether or not an overcurrent has been generated in the first winding group 11 or in the lines between the first inverter section 21 and the first winding group 11. The threshold value is set to, for example, 200 A.

If it is determined that a short-circuit abnormality has not occurred (S02: NO), in step S03, the controller 41 initializes a first abnormality counter to 0. Then, after a predetermined standby time is passed, the processes in step S01 and the later steps are performed again. The initial value of the first abnormality counter is 0. If it is determined that a short-circuit abnormality has occurred (S02: YES), in step S04, the controller 41 increments the first abnormality counter by 1.

After the process in step S04, in step S05, the controller 41 determines whether or not the first abnormality counter is a predetermined value (for example, 5) or more. If the first abnormality counter is less than the predetermined value (S05: NO), the controller 41 waits until the predetermined standby time is passed, and then performs again the processes in step S01 and the later steps.

If the first abnormality counter is the predetermined value or more (S05: YES), in step S06, the controller 41 decreases the amount of current flowing from the first inverter section 21 to the first winding group 11. Specifically, the controller 41 sets the command value Iq1* of the q axis current flowing to the first winding group 11 to 0 A and sets the command value Id1* of the d axis current to 10 A. In step S07, the controller 41 doubles the amount of current flowing from the second inverter section 22 to the second winding group 12. In this case, the controller 41 limits the amount of current flowing from the second inverter section 22 to the second winding group 12 so as not to exceed the maximum value of the current which can be applied to the second winding group 12. After step S207, the controller 41 waits until the predetermined standby time is passed.

In step S08, the controller 41 obtains, from the first current detection section 26, detection values of the currents Iu1, Iv1, and Iw1 of the respective phases flowing from the first inverter section 21 to the first winding group 11. In step S09, the controller 41 determines whether or not a short-circuit abnormality has occurred based on the detection values of the currents Iu1, Iv1, and Iw1 of the respective phases. Specifically, the controller 41 determines whether or not a short-circuit abnormality has occurred based on whether or not at least one of the detection values of the currents Iu1, Iv1, and Iw1 of the respective phases has exceeded a predetermined threshold value (200 A). It is noted that the threshold value used for the determination in step S02 and the threshold value used for the determination in step S09 may be different from each other.

If it is determined that a short-circuit abnormality has occurred (S09: YES), in step S10, the controller 41 increments a second abnormality counter by 1. The initial value of the second abnormality counter is 0. In step S11, the controller 41 determines whether or not the second abnormality counter is a predetermined value (for example, 5) or more. If the second abnormality counter is less than the predetermined value (S11: NO), the controller 41 waits until the predetermined standby time is passed, and then performs again the processes in step S08 and the later steps. If the second abnormality counter is the predetermined value or more (S11: YES), in step S12, the controller 41 stops the electrical power supply from the first inverter section 21 to the first winding group 11.

In contrast, if it is determined that a short-circuit abnormality has not occurred (S09: NO), in step S03, the controller 41 initializes the second abnormality counter to 0. In step S14, the controller 41 increments a normality counter by 1. The initial value of the normality counter is 0. In step S15, the controller 41 determines whether or not the normality counter is a predetermined value (for example, 5) or more. If the normality counter is less than the predetermined value (S15: NO), the controller 41 waits until the predetermined standby time is passed, and then performs again the processes in step S09 and the later steps. If the normality counter is the predetermined value or more (S15: YES), in step S16, the controller 41 initializes the first abnormality counter and the normality counter. Thereafter, the controller 41 waits until the predetermined standby time is passed, and then performs again the processes in step S01 and the later steps.

Figure 7:
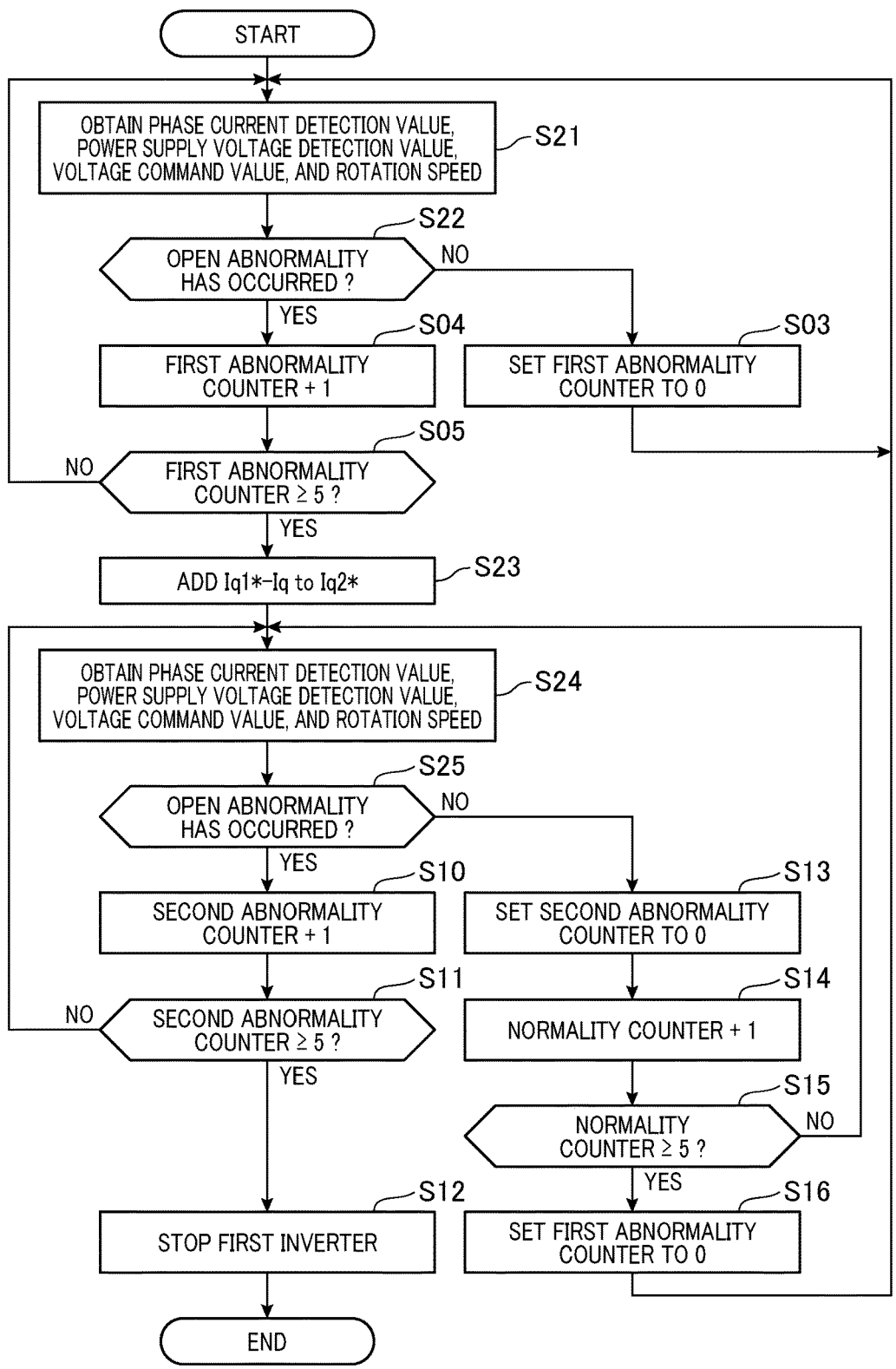
FIG. 7 is a flowchart of an abnormality determination process regarding an open abnormality.

FIG. 7 shows a flowchart of a determination process regarding an open abnormality. The determination process is performed by the controller 41. The step equivalent to that in FIG. 6 is denoted by the same sign to omit redundant description. Although the first abnormality counter, the second abnormality counter, and the normality counter in the flowchart shown in FIG. 6 and the first abnormality counter, the second abnormality counter, and the normality counter in the flowchart shown in FIG. 7 are respectively the same designations as a matter of convenience, they are individual variables.

In the flowchart shown in FIG. 7, the process in step S21 is performed instead of the process in step S01 in FIG. 6, the process in step S22 is performed instead of the process in step S02 in FIG. 6, the process in step S06 is omitted, the process in step S23 is performed instead of the process in step S07 in FIG. 6, the process in step S24 is performed instead of the process in step S08 in FIG. 6, and the process in step S25 is performed instead of the process in step S09 in FIG. 6. The processes in steps S21, S22, S03 to S05 shown in FIG. 7 correspond to the processes performed by the first abnormality determination section. The processes in steps S23 to S25 and S10 to S16 shown in FIG. 7 correspond to the processes performed by the second abnormality determination section.

In step S21, the controller 41 obtains, from the first current detection section 26, the detection values of the currents Iu1, Iv1, and Iw1 of the respective phases flowing from the first inverter section 21 to the first winding group 11. The controller 41 obtains the detection value of output voltage (power supply voltage) of the battery 30. The controller 41 obtains the command values Vu1*, Vv1*, and Vw1* of the output voltage of the first inverter section 21 and the rotation speed of the motor 10. In step S22, the controller 41 determines whether or not an open abnormality has occurred based on the values obtained in step S21. Specifically, the controller 41 determines whether or not the detection values of the currents of the respective phases fall below a predetermined threshold value, and the detection values of the power supply voltage exceed a predetermined threshold value, and whether or not the command values Vu1*, Vv1*, and Vw1* of the output voltage of the first inverter section 21 exceed a predetermined threshold value, and the rotation speed of the motor 10 falls below a predetermined threshold value.

In step S22, the threshold value used for the determination regarding the detection values of the currents Iu1, Iv1, and Iw1 of the respective phases are set to values by which it can be determined that current is not following from the first inverter section 21 to the first winding group 11. For example, the threshold value is set to 30 V. In addition, the threshold value used for the determination regarding the detection value of the power supply voltage is set to a value by which it can be determined that electric power is being supplied from the battery 30 to the first inverter section 21. For example, the threshold value is set to 9 V. The threshold value used for the determination regarding the command values Vu1*, Vv1*, and Vw1* of the output voltage of the first inverter section 21 is set to a value by which it can be determined that electrical power is being output from the first inverter section 21 to the first winding group 11. For example, the threshold value is set to 5 V. The threshold value used for the determination regarding the rotation speed of the motor 10 is set to a value by which it can be determined that current is not following from the first inverter section 21 to the first winding group 11. For example, the threshold value is set to 500 rpm. It is noted that the determination regarding the detection value of the power supply voltage and the determination regarding the rotation speed may be omitted.

If it is determined that an open abnormality has occurred (S22: YES), the controller 41 performs the processes in step S04 and the later steps. If it is determined that an open abnormality has not occurred (S22: NO), the controller 41 performs the processes in step S05 and the later steps.

In step S05, if a positive determination is made (S05: YES), in step S23, the controller 41 increases output current flowing from the second inverter section 22 to the second winding group 12. Specifically, the controller 41 calculates the difference between the detection value Iq1 and the command value Iq1* of output current flowing from the first inverter section 21 to the first winding group 11, and adds the difference to the command value Iq2* of output current flowing from the second inverter section 22 to the second winding group 12. In this case, the controller 41 limits the amount of current flowing from the second inverter section 22 to the second winding group 12 so as not to exceed the maximum value of the current, which can be applied to the second winding group 12. After step S23, and after the predetermined standby time is passed, the controller 41 performs the processes in step S24 and the later steps.

In step S24, the controller 41 obtains, from the first current detection section 26, the detection values of the phase currents Iu1, Iv1, and Iw1 flowing from the first inverter section 21 to the first winding group 11. The controller 41 obtains the detection value of output voltage (power supply voltage) of the battery 30. The controller 41 obtains the command values Vu1*, Vv1*, and Vw1* of the output voltage of the first inverter section 21 and the rotation speed of the motor 10. In step S25, the controller 41 determines whether or not an open abnormality has occurred based on the values obtained in step S24. Specifically, the controller 41 determines whether or not the detection values of the currents of the respective phases fall below a predetermined threshold value, and the detection value of the power supply voltage exceeds a predetermined threshold value, and whether or not the command values Vu1*, Vv1*, and Vw1* of the output voltage of the first inverter section 21 exceed a predetermined threshold value, and the rotation speed of the motor 10 falls below a predetermined threshold value. It is noted that the threshold value used for the determination in step S22 and the threshold value used for the determination in step S25 may be different from each other.

In step S25, if a positive determination is made, that is, if it is determined that an open abnormality has occurred (S25: YES), the controller 41 performs the process in step S10. In step S25, if a negative determination is made, that is, if it is determined that an open abnormality has not occurred (S25: NO), the controller 41 performs the process in step S13.

Figure 8:
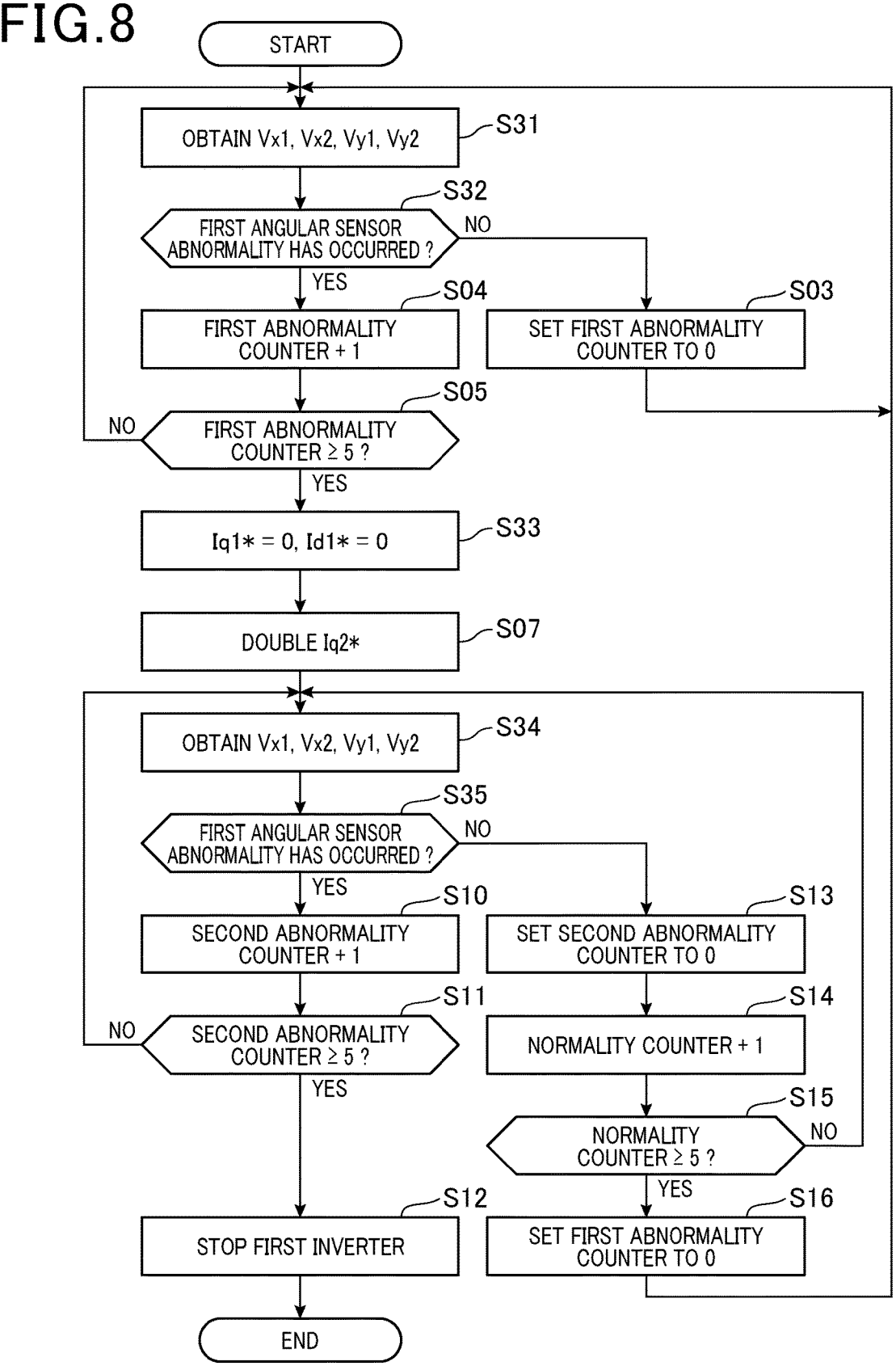
FIG. 8 is a flowchart of an abnormality determination process regarding a first angular sensor.

FIG. 8 shows a flowchart of an abnormality determination process regarding the first angular sensor 28. The determination process is performed by the controller 41. The step equivalent to that in FIG. 6 is denoted by the same sign to omit redundant description. Although the first abnormality counter, the second abnormality counter, and the normality counter in the flowcharts shown in FIGS. 6 and 7 and the first abnormality counter, the second abnormality counter, and the normality counter in the flowchart shown in FIG. 8 are respectively the same designations as a matter of convenience, they are individual variables.

In the flowchart shown in FIG. 8, the process in step S31 is performed instead of the process in step S01 in FIG. 6, the process in step S32 is performed instead of the process in step S02 in FIG. 6, the process in step S33 is performed instead of the process in step S07 in FIG. 6, the process in step S34 is performed instead of the process in step S08 in FIG. 6, and the process in step S35 is performed instead of the process in step S09 in FIG. 6. The processes in steps S31, S32, and S03 to S05 shown in FIG. 8 correspond to the processes performed by the first abnormality determination section. The processes in steps S33, S07, S34, S35, and S10 to S16 shown in FIG. 8 correspond to the processes performed by the second abnormality determination section.

In step S31, the controller 41 obtains the cosine wave voltages Vx1 and Vx2 and the sine wave voltages Vy1 and Vy2 from the first angular sensor 28. In step S32, the controller 41 determines whether or not an abnormality has occurred in the first angular sensor 28. Specifically, if the difference between the cosine wave voltage Vx1 and the cosine wave voltage Vx2 is more than a predetermined threshold value, or if the difference between the sine wave voltage Vy1 and the sine wave voltage Vy2 is more than a predetermined threshold value, the controller 41 determines that an abnormality has occurred in the first angular sensor 28. Alternatively, the detection value of a rotational angle based on the cosine wave voltage Vx1 and the sine wave voltage Vy1 may be compared with the detection value of a rotational angle based on the cosine wave voltage Vx2 and the sine wave voltage Vy2 to determine that an abnormality has occurred in the first angular sensor 28 if the difference between the detection values is a predetermined value or more.

If an abnormality has occurred in the first angular sensor 28 (S32: YES), the controller 41 performs the processes in step S04 and the later steps. If an abnormality has not occurred in the first angular sensor 28 (S32: NO), the controller 41 performs the processes in step S03 and the later steps.

In step S05, if a positive determination is made (S05: YES), in step S33, the controller 41 decreases the amount of current flowing from the first inverter section 21 to the first winding group 11. Specifically, the controller 41 sets the command value Iq1* of the q axis current and the command value Id1* of the d axis current flowing to the first winding group 11 to 0 A. After the step S33, the controller 41 performs the process in step S07 and the later steps.

In step S34, the controller 41 obtains the cosine wave voltages Vx1 and Vx2 and the sine wave voltages Vy1 and Vy2 from the first angular sensor 28. In step S35, the controller 41 determines whether or not an abnormality has occurred in the first angular sensor 28. Specifically, if the difference between the cosine wave voltage Vx1 and the cosine wave voltage Vx2 is more than a predetermined threshold value, or the difference between the sine wave voltage Vy1 and the sine wave voltage Vy2 is more than a predetermined threshold value, the controller 41 determines that an abnormality has occurred in the first angular sensor 28. Alternatively, the detection value of a rotational angle based on the cosine wave voltage Vx1 and the sine wave voltage Vy1 may be compared with the detection value of a rotational angle based on the cosine wave voltage Vx2 and the sine wave voltage Vy2 to determine that an abnormality has occurred in the first angular sensor 28 if the difference between the detection values is a predetermined value or more. The threshold values in step S32 and step S34 may be different from each other.

If an abnormality has occurred in the first angular sensor 28 (S35: YES), the controller 41 performs the processes in step S10 and the later steps. If an abnormality has not occurred in the first angular sensor 28 (S35: NO), the controller 41 performs the processes in step S13 and the later steps.

Figure 9:
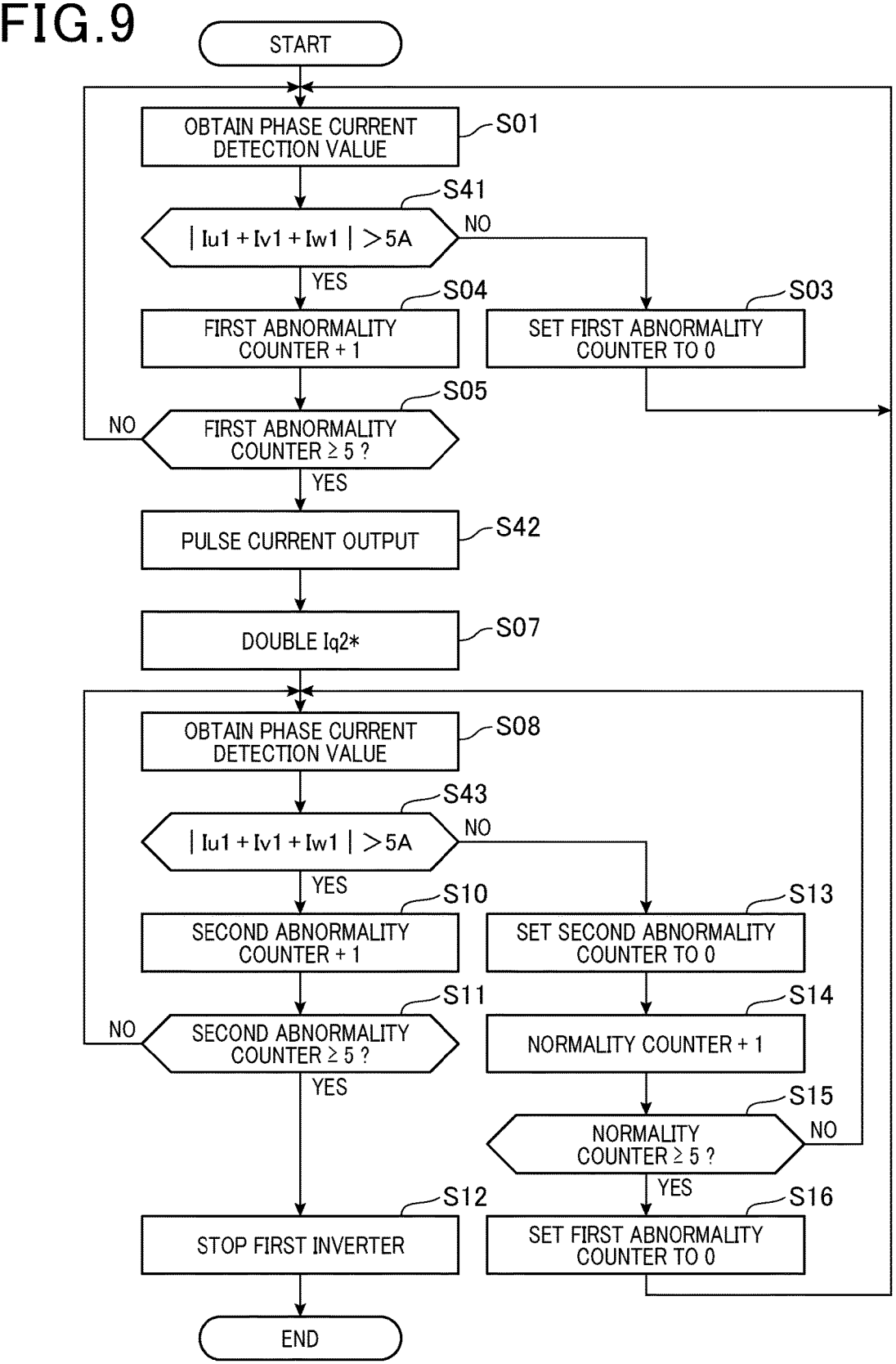
FIG. 9 is a flowchart of an abnormality determination process regarding a first current detector.

FIG. 9 is a flowchart of an abnormality determination process regarding the first current detection section 26. The determination process is performed by the controller 41. The step equivalent to that in FIG. 6 is denoted by the same sign to omit redundant description. Although the first abnormality counter, the second abnormality counter, and the normality counter in the flowcharts shown in FIG. 6 to FIG. 8 and the first abnormality counter, the second abnormality counter, and the normality counter in the flowchart shown in FIG. 9 are respectively the same designations as a matter of convenience, they are individual variables.

In the flowchart shown in FIG. 9, the process in step S41 is performed instead of the process in step S02 in FIG. 6, the process in step S42 is performed instead of the process in step S06 in FIG. 6, and the process in step S43 is performed instead of the process in step S09 in FIG. 6. The processes in steps S01, S41, and S03 to S05 shown in FIG. 9 correspond to the processes performed by the first abnormality determination section. The processes in steps S42, S07, S08, S43, and S10 to S16 shown in FIG. 9 correspond to the processes performed by the second abnormality determination section.

In step S41, the controller 41 determines whether or not an abnormality has occurred in the first current detection section 26 based on the detection values of the phase currents Iu1, Iv1, and Iw1 obtained by the first current detection section 26 in step S01. Specifically, the controller 41 determines whether or not the sum of the detection values of the phase currents Iu1, Iv1, and Iw1 obtained by the first current detection section 26 is more than a threshold value (e.g. 5 A). If the first current detection section 26 is in a normal state, the sum of the detection values of the phase currents Iu1, Iv1, and Iw1 obtained by the first current detection section 26 is substantially 0 A. Hence, setting the threshold value used for the determination in step S41 to a predetermined threshold value more than 0 A can determine the abnormality of the first current detection section 26 (for example, the abnormality in which one or two of the detection values of the phase currents Iu1, Iv1, and Iw1 are fixed to 0 A). It is noted that when the voltage of a predetermined value or more is output from the first inverter section 21 to the first winding group 11, and at least one of the detection values of the phase currents Iu1, Iv1, and Iw1 obtained by the first current detection section 26 is fixed to 0 A, it may be determined that an abnormality has occurred in the first current detection section 26.

In step S05, if a positive determination is made (S05: YES), in step S42, the controller 41 decreases the amount of current flowing from the first inverter section 21 to the first winding group 11. Specifically, the controller 41 sets the command value Iq1* of the q axis current flowing to the first winding group 11 to 0 A. Furthermore, the controller 41 varies the command value Id1* of the d axis current with a period longer than the time constant of the circuit at the first winding group 11 side with respect to the first inverter section 21 and shorter than the yaw rate time constant, which is response time between the time when torque is output from the motor 10 to the time when the yaw rate of the vehicle varies so that the root-mean-square value becomes 0. Hence, while the yaw rate of the vehicle is prevented from varying due to the torque generated in the motor 10 by the current flowing to the first winding group 11, current can be applied from the first inverter section 21 to the first winding group 11.

In step S43, the controller 41 determines whether or not an abnormality has occurred in the first current detection section 26 based on the detection values of the phase currents Iu1, Iv1, and Iw1 obtained by the first current detection section 26 in step S08. Specifically, the controller 41 determines whether or not the sum of the detection values of the phase currents Iu1, Iv1, and Iw1 obtained by the first current detection section 26 is more than a threshold value (e.g. 5 A). The threshold value used in step S41 and the threshold value used in step S43 may be different from each other.

Figure 10:
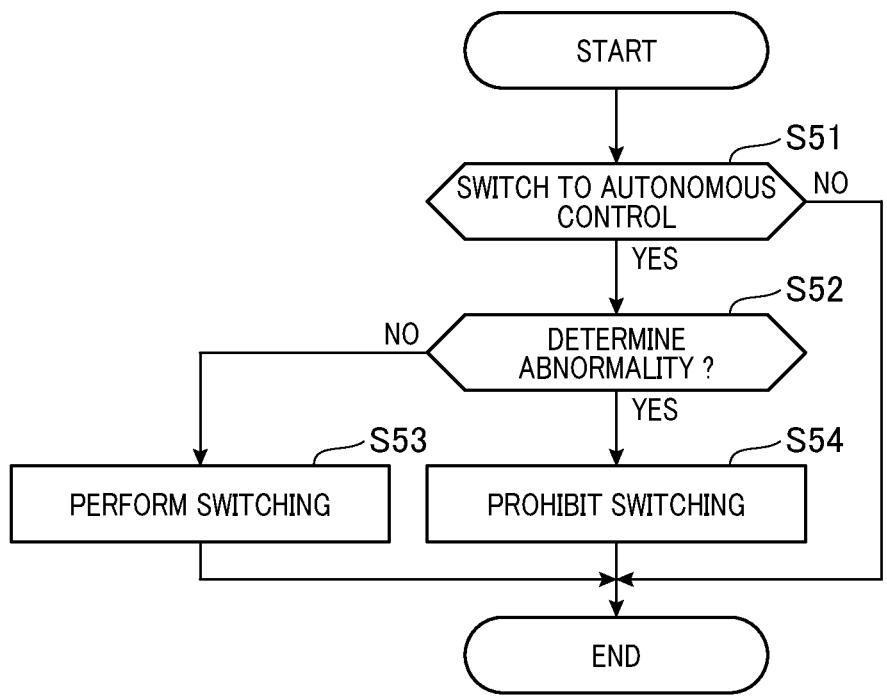
FIG. 10 is a flowchart of a switching process between autonomous control and manual control.

FIG. 10 shows a flowchart of a switching process between autonomous control and manual control. The present process is performed by the control unit 60 at predetermined intervals.

In step S51, the controller 41 determined whether or not a switching command for switching from the manual control to the autonomous control is received. If the switching command is not received (S51: NO), the controller 41 ends the present process. If the switching command is received (S51: YES), in step S52, the controller 41 determines whether or not the electric power steering system 5 is in a normal state. Specifically, the controller 41 determines whether or not the controller 41 has sent the control unit 60 the information that an abnormality has occurred in the electric power steering system 5. If the electric power steering system 5 is in a normal state (S52: NO), in step S53, the controller 41 switches from the manual control to autonomous control and ends the present process. If the electric power steering system 5 is in an abnormal state (S52: YES), in step S54, the controller 41 prohibits switching from the manual control to the autonomous control and ends the present process.

Other Embodiments

The controller 41 of the above embodiment determines a short-circuit abnormality, an open abnormality, an abnormality of the first current detection section 26, and an abnormality of the first angular sensor 28. Instead of this, the controller 41 may determine at least one of a short-circuit abnormality, an open abnormality, an abnormality of the first current detection section 26, and an abnormality of the first angular sensor 28.

The motor 10 of the above embodiment includes two winding groups 11 and 12. Instead of this, three or more winding groups may be provided.

A permanent magnet type brushless motor is used as the motor 10 of the above embodiment. Instead of this, for example, a field winding type brushless motor may be used.

The autonomous driving control by the autonomous driving control unit may be omitted.

The rotary electric machine system may be applied to the system other than the steering system. That is, the configuration of the present embodiment may be applied to a rotary electric machine system including a rotary electric machine operating as a power source of the vehicle.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As a first aspect of the embodiment, a rotary electric machine system (90) is provided that includes: a rotary electric machine (10) that includes a first armature winding group (11) and a second armature winding group (12) independent of each other; a first power supply system (21) that supplies power to the first armature winding group; a second power supply system (22) that supplies power to the second armature winding group; a sensor (26, 28) that detects a predetermined state quantity used for controlling power output from the first power supply system to the first armature winding group; a first abnormality determination section (41) that determines whether or not an abnormality has occurred in at least one of the first armature winding group, the first power supply system, and the sensor; a second abnormality determination section (41) that, on condition that occurrence of an abnormality has been determined by the first abnormality determination section, controls the power output depending on a type of the abnormality whose occurrence is determined by the first abnormality determination section, increases an amount of current flowing from the second power supply system to the second armature winding group when output torque generated due to current flowing to the first armature winding group decreases, to increase output torque generated due to the current flowing to the second armature winding group, and determines whether or not an abnormality has occurred in at least one of the first armature winding group, the first power supply system, and the sensor; and a prohibition section that, on condition that occurrence of an abnormality has been determined by the second abnormality determination section, prohibits electrical power from being supplied from the first power supply system to the first armature winding group.

The rotary electric machine of the first aspect includes the first armature winding group and the second armature winding group independent of each other. On condition that occurrence of an abnormality has been determined by the first abnormality determination section, the second abnormality determination section controls power output from the first power supply system to the first armature winding group depending on a type of the abnormality whose occurrence is determined by the first abnormality determination section. Continuing power output from the first power supply system to the first armature winding group maintains a state where abnormality determination can be made while reducing output torque generated due to current flowing to the first armature winding group. Furthermore, when the output torque generated due to the current flowing to the first armature winding group decreases, the amount of current flowing to the second armature winding group is increased to increase output torque generated due to the current flowing to the second armature winding group. Hence, even when an abnormality has occurred in at least one of the first armature winding group, the first power supply system, and the sensor, the output torque of the whole rotary electric machine can be prevented from fluctuating while the second abnormality determination section determines an abnormality.

In addition, on condition that occurrence of an abnormality has been determined by the first abnormality determination section, the second abnormality determination section determines whether or not an abnormality has occurred in at least one of the first armature winding group, the first power supply system, and the sensor. On condition that occurrence of an abnormality has been determined by the second abnormality determination section, the prohibition section prohibits electrical power from being supplied from the first power supply system to the first armature winding group. Performing abnormality determinations doubly by the first abnormality determination section and the second abnormality determination section can improve the accuracy in determining an abnormality. That is, output torque of the rotary electric machine can be prevented from fluctuating when an abnormality has occurred in the rotary electric machine, and the time period during which the output torque fluctuates can be shortened, without decreasing the accuracy in determining an abnormality of the rotary electric machine.

As a second aspect of the embodiment, in the first aspect, the sensor includes a first angular sensor (28) that detects a rotational angle of the rotary electric machine. The rotary electric machine system further includes: a second angular sensor (29) that detects a rotational angle of the rotary electric machine; a first controller that controls power output from the first power supply system to the first armature winding group based on a detection value of the first angular sensor; and a second controller that controls power output from the second power supply system to the second armature winding group based on a detection value of the second angular sensor. The first abnormality determination section determines whether or not an abnormality has occurred in the first angular sensor. On condition that the first abnormality determination section determines that the abnormality has occurred in the first angular sensor, the second abnormality determination section changes current flowing from the first power supply system to the first armature winding group to 0 A, and determines whether or not an abnormality has occurred in the first angular sensor.

In the second aspect of the embodiment, the first controller controls power output to the first armature winding group based on a detection value of the first angular sensor. The second controller controls power output to the second armature winding group based on the detection value of the second angular sensor. Since the first controller and the second controller control power output to the armature winding by using the detection values from the different angular sensors, driving the rotary electric machine can be continued even when an abnormality has occurred in one of the controls by the first controller and the second controller.

In addition, on condition that the first abnormality determination section determines that the abnormality has occurred in the first angular sensor, the second abnormality determination section of the present aspect changes current flowing from the first power supply system to the first armature winding group to 0 A. Hence, electric power can be prevented from being supplied to the first armature winding group based on an incorrect detection value of the rotation angle to prevent output torque of the rotary electric machine from fluctuating. In addition, since the rotation of the rotary electric machine continues by the current flowing to the second armature winding group, it can be determined whether an abnormality has occurred in the first angular sensor.

As a third aspect of the embodiment, in the first or second aspect, the first abnormality determination section determines whether or not a short-circuit abnormality has occurred in at least one of the first armature winding group and the first power supply system. On condition that the first abnormality determination section determines that the short-circuit abnormality has occurred, the second abnormality determination section changes a q axis current flowing from the first power supply system to the first armature winding group to 0 A, changes a d axis current flowing from the first power supply system to the first armature winding group to a predetermined value other than 0 A, and determines whether or not the short-circuit abnormality has occurred.

In the situation where a short-circuit abnormality has occurred in at least one of the first armature winding group and the first power supply system, if power supply is continued from the first power supply system to the first armature winding group, there is a concern that lines or elements may be damaged due the large current. To solve this, on condition that the first abnormality determination section determines that the short-circuit abnormality has occurred in at least one of the first armature winding group and the first power supply system, a q axis current flowing from the first power supply system to the first armature winding group is changed 0 A, and a d axis current flowing from the first power supply system to the first armature winding group is changed to a predetermined value other than 0 A. Hence, large current is prevented from flowing from the first power supply system to the first armature winding group. In addition, current flows from the first power supply system to the first armature winding group. Thus, it can be determined whether or not short-circuit abnormality has actually occurred.

As a fourth aspect of the embodiment, in one of the first to third aspects, the sensor includes a current sensor (26) that detects a current flowing from the first power supply system to the first armature winding group. The first abnormality determination section determines whether or not an abnormality has occurred in the current sensor. On condition that the first abnormality determination section determines that the abnormality has occurred in the current sensor, the second abnormality determination section varies the current flowing from the first power supply system to the first armature winding group with a period longer than a time constant of a circuit including the first armature winding group so that a root-mean-square value becomes 0, and determines whether or not an abnormality has occurred in the current sensor.

The circuit including an armature winding group having a large inductance component acts as a lowpass filter. Hence, the current flowing from the first power supply system to the first armature winding group is varied with a period longer than a time constant of a circuit including the armature winding group so that a root-mean-square value becomes 0. Thus, it can be determined whether or not an abnormality has occurred in the current sensor while output torque of the rotary electric machine is prevented from fluctuating due to the power supply to the first armature winding group.

As a fifth aspect of the embodiment, in any one of the second to fourth aspects, the second abnormality determination section sets a current flowing from the second power supply system to the second armature winding group to twice that set before the first abnormality determination section determines that the abnormality has occurred to increase output torque generated due to the current flowing to the second armature winding group.

In one of the second to fourth aspects, the second abnormality determination section sets a current flowing from the second power supply system to the second armature winding group to twice that set before the first abnormality determination section determines that the abnormality has occurred. If the current flowing to the first armature winding group (q axis current) is 0 A, output torque of the rotary electric machine generated due to the current flowing to the first armature winding group becomes 0. For example, in the configuration having only the first armature winding group and the second armature winding group as armature winding groups, the output torque of the rotary electric machine decreases by half. Hence, doubling the current flowing from the second power supply system to the second armature winding group doubles the output torque of the rotary electric machine generated due to the current flowing to the second armature winding group, whereby the decrease of the output torque of the rotary electric machine due to the setting of the current flowing to the first armature winding group to 0 A can be compensated by the simple control.

As a sixth aspect of the embodiment, in any one of the first to fifth aspects, the first abnormality determination section determines whether or not an open abnormality has occurred in at least one of the first armature winding group and the first power supply system. On condition that the first abnormality determination section determines that the open abnormality has occurred, the second abnormality determination section does not change a command value of a current flowing to the first armature winding group, calculates a difference between a command value of the current flowing to the first armature winding group and a detection value of the current flowing to the first armature winding group, and adds the difference to a command value of a current flowing from the second power supply system to the second armature winding group to increase output torque generated due to the current flowing to the second winding group, and determines whether or not an open abnormality has occurred.

If an open abnormality has occurred in one of the phases configuring the first power supply system and the first armature winding group, current does not flow through the phase. As a result, although power supply is continued from the first power supply system to the first armature winding group, the actual value of the current flowing to the first armature winding group becomes small compared with a target value of the current flowing to the first armature winding group. Hence, there is a concern that the torque of the rotary electric machine generated by the current flowing to the first armature winding group may decrease.

To solve this, on condition that the first abnormality determination section determines that the open abnormality has occurred in at least one of the first armature winding group and the first power supply system, the second abnormality determination section of the sixth aspect does not change a command value of a current flowing to the first armature winding group and continues power supply from the first power supply system to the first armature winding group. Hence, if an open abnormality has occurred in one of the plurality of phases configuring the first armature winding group, and if the other phases are in normal states, torque can be output by applying current to the normal phase. In addition, the second abnormality determination section of the sixth aspect calculates a difference between a target value of the current flowing to the first armature winding group and a detection value of the current flowing to the first armature winding group, and adds the difference to a target value of a current flowing from the second power supply system to the second armature winding group. According to the present configuration, even when the actual value (detection value) of the current flowing to the first armature winding group decreases compared with the target value of the current flowing to the first armature winding group, the current correspond to the decrease amount flows to the second armature winding group, whereby output torque of the rotary electric machine can be prevented from decreasing.

As a seventh aspect of the embodiment, in any one of the first to sixth aspects, the second abnormality determination section increases an amount of current flowing from the second power supply system to the second armature winding group so as not to exceed a maximum value of a current that is capable of flowing to the second winding group.

Specifically, the second abnormality determination section increases the amount of current flowing from the second power supply system to the second armature winding group so as not to exceed the maximum value of a current that can be applied to the second winding group. The maximum value of the current that can be applied to the second armature winding group is set based on, for example, the maximum current that can be output from the second power supply system or the characteristics of the second armature winding group.

As an eighth aspect of the embodiment, in any one of the first to seventh aspects, the rotary electric machine system is applied to an electric power steering system (5) outputting torque corresponding to steering torque.

When the vehicle is running at the speed higher than a predetermined speed, output torque required for the rotary electric machine configuring the electric power steering system becomes relatively small value. That is, the output torque of the rotary electric machine of the running vehicle has a margin with respect to the maximum torque that the rotary electric machine can output. Hence, when the vehicle is running as usual, even when output torque decreases which is generated due to the current flowing from the first power supply system to the first armature winding group, increasing the output torque generated due to the current flowing from the second power supply system to the second armature winding group can sufficiently compensate the decrease of the output torque. That is, in the configuration in which the rotary electric machine system is applied to the electric power steering system, when the first abnormality determination section determines that an abnormality has occurred while the vehicle is running, the second abnormality determination section can perform abnormality determination while the output torque required for the rotary electric machine is output. Thus, safety in the running vehicle can be improved.

What is claimed is:

1. A rotary electric machine system, comprising:
a rotary electric machine that includes a first armature winding group and a second armature winding group independent of each other;
a first power supply system supplying power to the first armature winding group;
a second power supply system supplying power to the second armature winding group;
a sensor detecting a predetermined state quantity used for controlling power output from the first power supply system to the first armature winding group;
a first abnormality determination section configured to determine whether or not an abnormality has occurred in at least one of the first armature winding group, the first power supply system, and the sensor, and measures time, during which the first abnormality determination section determines that an abnormality has occurred, by using a first abnormality counter;
a second abnormality determination section configured to perform abnormal case control under which, on condition that the first abnormality determination section determines that an abnormality has occurred for a predetermined time or more,
the power output is controlled depending on a type of the abnormality whose occurrence is determined by the first abnormality determination section,
an amount of current flowing from the second power supply system to the second armature winding group is increased when output torque generated due to current flowing to the first armature winding group decreases, to increase output torque generated due to the current flowing to the second armature winding group, and
the second abnormality determination section determines whether or not an abnormality has occurred in at least one of the first armature winding group, the first power supply system, and the sensor by measuring time, during which a same abnormality as determined by the first abnormality determination section to have occurred continues, by using a second abnormality counter, and by measuring discontinuation of the same abnormality by using a normality counter; and
a prohibition section configured to prohibit, on condition that the second abnormality determination section determines that an abnormality has occurred for a predetermined time or more, electrical power from being supplied from the first power supply system to the first armature winding group, wherein
the abnormal case control is stopped on condition that a state where an abnormality does not continue has continued for a predetermined time or more.

2. The rotary electric machine system according to claim 1, wherein
the sensor includes a first angular sensor that detects a rotational angle of the rotary electric machine, and
the rotary electric machine system further comprises:

a second angular sensor that detects a rotational angle of the rotary electric machine;
a first controller that controls power output from the first power supply system to the first armature winding group based on a detection value of the first angular sensor; and
a second controller that controls power output from the second power supply system to the second armature winding group based on a detection value of the second angular sensor, wherein
the first abnormality determination section determines whether or not an abnormality has occurred in the first angular sensor, and
on condition that the first abnormality determination section determines that the abnormality has occurred in the first angular sensor, the second abnormality determination section changes current flowing from the first power supply system to the first armature winding group to 0 A, and determines whether or not an abnormality has occurred in the first angular sensor.

3. The rotary electric machine system according to claim 1, wherein
the first abnormality determination section determines whether or not a short-circuit abnormality has occurred in at least one of the first armature winding group and the first power supply system, and
on condition that the first abnormality determination section determines that the short-circuit abnormality has occurred, the second abnormality determination section changes a q axis current flowing from the first power supply system to the first armature winding group to 0 A, changes a d axis current flowing from the first power supply system to the first armature winding group to a predetermined value other than 0 A, and determines whether or not the short-circuit abnormality has occurred.

4. The rotary electric machine system according to claim 1, wherein
the sensor includes a current sensor that detects a current flowing from the first power supply system to the first armature winding group,
the first abnormality determination section determines whether or not an abnormality has occurred in the current sensor,
on condition that the first abnormality determination section determines that the abnormality has occurred in the current sensor, the second abnormality determination section varies the current flowing from the first power supply system to the first armature winding group with a period longer than a time constant of a circuit including the first armature winding group so that a root-mean-square value becomes 0, and determines whether or not an abnormality has occurred in the current sensor.

5. The rotary electric machine system according to claim 2, wherein
the second abnormality determination section sets a current flowing from the second power supply system to the second armature winding group to twice that set before the first abnormality determination section determines that the abnormality has occurred to increase output torque generated due to the current flowing to the second armature winding group.

6. The rotary electric machine system according to claim 1, wherein
the first abnormality determination section determines whether or not an open abnormality has occurred in at least one of the first armature winding group and the first power supply system, and on condition that the first abnormality determination section determines that the open abnormality has occurred, the second abnormality determination section does not change a command value of a current flowing to the first armature winding group, calculates a difference between a command value of the current flowing to the first armature winding group and a detection value of the current flowing to the first armature winding group, and adds the difference to a command value of a current flowing from the second power supply system to the second armature winding group to increase output torque generated due to the current flowing to the second winding group, and determines whether or not the open abnormality has occurred.

7. The rotary electric machine system according to claim 1, wherein the second abnormality determination section increases an amount of current flowing from the second power supply system to the second armature winding group so as not to exceed a maximum value of a current that is capable of flowing to the second winding group.

8. The rotary electric machine system according to claim 1, wherein the rotary electric machine system is applied to an electric power steering system outputting torque corresponding to steering torque.

9. The rotary electric machine system according to claim 1, wherein situations in which the first abnormality determination section and the second abnormality determination section perform the determinations are different from each other.

10. A method for controlling a rotary electric machine that includes a first armature winding group and a second armature winding group, comprising:

supplying power to the first armature winding group using a first power supply system;

supplying power to the second armature winding group using a second power supply system;

detecting, using a sensor, a predetermined state quantity used for controlling power output from the first power supply system to the first armature winding group;

determining, using a first abnormality determination section, whether an abnormality has occurred in at least one of the first armature winding group, the first power supply system, and the sensor, and measuring time, by using a first abnormality counter, to determine whether or not an abnormality has occurred;

performing, using a second abnormality determination section, abnormal case control under which, on condition that an abnormality has been determined to have occurred for a predetermined time or more, the power output is controlled depending on a type of the abnormality whose occurrence is determined, and an amount of current flowing from the second power supply system to the second armature winding group is increased when output torque generated due to current flowing to the first armature winding group decreases, such that output torque generated due to the current flowing to the second armature winding group increase, and determining whether or not an abnormality has occurred in at least one of the first armature winding group, the first power supply system, and the sensor by measuring time, during which the same abnormality as that determined by the first abnormality determination section is determined to have occurred continues, by using a second abnormality counter, and by measuring discontinuation of the same abnormality by using a normality counter; and prohibiting, on condition the second abnormality determination section determines that an abnormality has occurred for a predetermined time or more, electrical power from being supplied from the first power supply system to the first armature winding group, wherein the abnormal case control is stopped on condition that a state where an abnormality does not continue has continued for a predetermined time or more.

* * * * *

UNITED STATES PATENT AND TRADEMARK OFFICE
CERTIFICATE OF CORRECTION

PATENT NO. : 10,298,165 B2
APPLICATION NO. : 15/801650
DATED : May 21, 2019
INVENTOR(S) : Takashi Suzuki Page 1 of 1

It is certified that error appears in the above-identified patent and that said Letters Patent is hereby corrected as shown below:

On the Title Page

Column 1 (Assignee), change "Denso Corporation" to --DENSO CORPORATION--.

In the Specification

Column 4, Line 62, change "contoller" to --controller--.

Column 11, Line 38, change "winding to" to --winding--.

Signed and Sealed this
Twenty-second Day of October, 2019

Andrei Iancu
*Director of the United States Patent and Trademark Office*